United States Patent
Kolodner et al.

(10) Patent No.: US 7,024,436 B2
(45) Date of Patent: Apr. 4, 2006

(54) COMPUTER SYSTEM WITH TWO HEAPS IN CONTIGUOUS STORAGE

(75) Inventors: Elliot Karl Kolodner, Haifa (IL); Ethan Lewis, Haifa (IL); Susan Patricia Paice, Eastleigh (GB); Samuel David Borman, Southsea (GB)

(73) Assignee: International Business Machines Corporation, Armonk, NY (US)

( * ) Notice: Subject to any disclaimer, the term of this patent is extended or adjusted under 35 U.S.C. 154(b) by 668 days.

(21) Appl. No.: 09/928,563

(22) Filed: Aug. 13, 2001

(65) Prior Publication Data
US 2002/0055941 A1    May 9, 2002

(30) Foreign Application Priority Data
Nov. 6, 2000    (GB)    ................................... 0027053

(51) Int. Cl.
*G06F 17/30*    (2006.01)

(52) U.S. Cl. .................................................. 707/206
(58) Field of Classification Search .................... 707/1, 707/101, 103 R, 205, 206; 711/170, 171
See application file for complete search history.

(56) References Cited

U.S. PATENT DOCUMENTS

| | | | | |
|---|---|---|---|---|
| 5,696,927 A | * | 12/1997 | MacDonald et al. | ........ 711/207 |
| 6,453,404 B1 | * | 9/2002 | Bereznyi et al. | ............ 711/171 |
| 6,728,852 B1 | * | 4/2004 | Stoutamire | .................. 711/170 |

OTHER PUBLICATIONS

Hiroshi Koide: The Generated Order Preserving Real-Time Garbage Collection.*

* cited by examiner

*Primary Examiner*—Mohammad Ali
*Assistant Examiner*—Etienne P LeRoux
(74) *Attorney, Agent, or Firm*—Michael J. Buchenhorner; Casey P. August

(57) ABSTRACT

A computer system provides an object-based environment. The computer system includes storage. A contiguous linear portion of the storage is logically divided into first and second heaps located at opposite ends of the linear portion of storage. Any gap between the two heaps represents an unallocated region of storage. The system permits references from objects on the first heap to objects on the second heap and vice versa. A garbage collector operates across both heaps to remove objects that are no longer live. Means are provided for expanding the first and second heaps into the unallocated region. The first heap is expanded according to a first expansion policy, and the second heap is expanded according to a second expansion policy.

30 Claims, 12 Drawing Sheets

COMPUTER SYSTEM WITH TWO HEAPS IN CONTIGUOUS STORAGE

CROSS-REFERENCE TO RELATED APPLICATIONS

The present application claims priority to foreign patent application No. 0027053.8, filed on Nov. 6, 2000 in the United Kingdom, entitled "A Computer System With Two Heaps In Contiguous Storage," which is herein incorporated by reference in its entirety.

BACKGROUND OF THE INVENTION

1. Field of the Invention

The invention relates to a computer system supporting an object-oriented environment having storage, at least a portion of which is divided into multiple heaps.

2. Description of the Related Art

Programs written in the Java programming language (Java is a trademark of Sun Microsystems Inc) are generally run in a virtual machine environment, rather than directly on hardware. Thus a Java program is typically compiled into byte-code form, and then interpreted by a Java virtual machine (JVM) into hardware commands for the platform on which the JVM is executing. The JVM itself is an application running on the underlying operating system. An important advantage of this approach is that Java applications can run on a very wide range of platforms, providing of course that a JVM is available for each platform.

Java is an object-oriented language. Thus a Java program is formed from a set of class files having methods that represent sequences of instructions (somewhat akin to subroutines). A hierarchy of classes can be defined, with each class inheriting properties (including methods) from those classes which are above it in the hierarchy. For any given class in the hierarchy, its descendants (i.e. below it) are call subclasses, whilst its ancestors (i.e. above it) are called superclasses. At run-time objects are created as instantiations of these class files, and indeed the class files themselves are effectively loaded as objects. One Java object can call a method in another Java object. In recent years Java has become very popular, and is described in many books, for example "Exploring Java" by Niemeyer and Peck, O'Reilly & Associates, 1996, USA, and "The Java Virtual Machine Specification" by Lindholm and Yellin, Addison-Wedley, 1997, USA.

The standard JVM architecture is generally designed to run only a single application, although this can be multi-threaded. In a server environment used for database transactions and such-like, each transaction is typically performed as a separate application, rather than as different threads within an application. This is to ensure that every transaction starts with the JVM in a clean state. In other words, a new JVM is started for each transaction (i.e. for each new Java application). Unfortunately however this results in an initial delay in running the application (the reasons for this will be described in more detail later). The overhead due to this frequent starting and then stopping a JVM as successive transactions are processed is significant, and seriously degrades the scalability of Java server solutions.

Various attempts have been made to mitigate this problem. EP-962860-A describes a process whereby one JVM can fork into a parent and a child process, this being quicker than setting up a fresh JVM. The ability to run multiple processes in a Java-like system, thereby reducing overhead per application, is described in "Processes in KaffeOS: Isolation, Resource Management, and Sharing in Java" by G back, W Hsieh, and J Lepreau (see: http://www.cs.utah.edu/flux/papers/kaffeos-osdi00/main.ht ml).

Another approach is described in "Oracle JServer Scalability and Performance" by Jeremy Litzt, July 1999 (see: http:www.oracle.com/database/documents/jserver_scalabilit y_and_performance_twp.pdf). The JServer product available from Oracle Corporation, USA, supports the concept of multiple sessions (a session effectively representing a transaction or application), each session including a JServer session. Resources such as read-only bytecode information are shared between the various sessions, but each individual session appears to its JServer client to be a dedicated conventional JVM.

U.S. patent application Ser. No. 09/304,160, filed Apr. 30, 1999 ("A long Running Reusable Extendible Virtual Machine"), assigned to IBM Corporation (IBM docket YOR9-1999-0170), discloses a virtual machine (VM) having two types of heap, a private heap and a shared heap. The former is intended primarily for storing application classes, whilst the latter is intended primarily for storing system classes and, as its name implies, is accessible to multiple VMs. A related idea is described in "Building a Java virtual machine for server applications: the JVM on OS/390" by Dillenberger et al, IBM Systems Journal, Vol 39/1, January 2000. Again this implementation uses a shared heap to share system and potentially application classes for reuse by multiple workers, with each worker JVM also maintaining a private or local heap to store data private to that particular JVM process.

The above documents are focused primarily on the ability to easily run multiple JVMs in parallel. A different (and potentially complementary) approach is based on a serial rather than parallel configuration. Thus it is desirable to run repeated transactions (i.e. applications) on the same JVM, since this could avoid having to reload all the system classes at the start of each application. However, one difficulty with this is that each application expects to run on a fresh, clean, JVM. There is a danger with serial re-use of a JVM that the state left from a previous transaction somehow influences the outcome of a new transaction. This unpredictability is unacceptable in most circumstances.

U.S. patent application Ser. No. 09/584,641 filed May 31, 2000 in the name of IBM Corporation (IBM docket number GB9-2000-0061) discloses an approach for providing a JVM with a reset capability. U.S. provisional application No. 60/208268 also filed May 31, 2000 in the name of IBM Corporation (IBM docket number YOR9-2000-0359) discloses the idea of having two heaps in a JVM. One of these is a transient heap, which is used to store transaction objects that will not persist into the next transaction, whilst a second heap is used for storing objects, such as system objects, that will persist. This approach provides the basis for an efficient reset mechanism by simply deleting the transient heap. The techniques described herein represent optimisations of the above methods, to allow the JVM reset to be performed as quickly and consistently as possible.

SUMMARY OF THE INVENTION

Accordingly the invention provides a computer system providing an object-based environment, said computer system including storage, a contiguous linear portion of which is logically divided into first and second heaps located at opposite ends of the storage portion, with any gap between the two heaps representing an unallocated region of storage, wherein references are permitted from objects on the first heap to objects on the second heap and vice versa, said system comprising:

a garbage collector for operating across both heaps to remove objects that are no longer live;

means for expanding the first heap into said unallocated region according to a first expansion policy; and means for expanding the second heap into said unallocated region according to a second expansion policy.

In a preferred embodiment, the computer system supports a transaction processing environment. The first heap is used for storing objects that are deleted at the end of the current transaction (and so can be regarded as a transient heap), and the second heap is used for storing objects that persist from one transaction to another. Since it is desired for each transaction to see as much as possible the same underlying system, the first heap is reset to the same predetermined initial size at the start of each transaction—an error condition is returned if the second heap has expanded such that it is not possible to reset the first heap to its predetermined initial size.

In the preferred embodiment, a midpoint is defined halfway between the first heap and second heap, when they each have their initial size (i.e. in the middle of the initially unallocated region). The first expansion policy is always to expand into the unallocated region in order to satisfy a storage request, whilst the second expansion policy is to expand into said unallocated region in order to satisfy a storage request until said midpoint is reached, whereupon said system preferentially performs a garbage collection to satisfy said request. Thus the first heap is generally freer to expand than the second heap. The reason for this is that the space will be reclaimed from the first heap at the end of the transaction, but this is not necessarily the case for the second heap. Nevertheless, the rate of expansion of the first heap into the unallocated region is slower once the first heap has passed said midpoint, in order to try to best conserve limited resources.

In the preferred embodiment, the second expansion policy further includes trying to shrink the first heap to allow room to expand said second heap in order to satisfy a storage request. In other words, if the first heap does not actually occupy all its allocated space, then it may be possible to transfer this to the second heap. This helps to optimize the use of storage between the two heaps.

Also in the preferred embodiment, the garbage collector optionally performs a compact operation after a garbage collection of the first and second heaps. The compact operation is performed in response to a first set of criteria relevant to the first heap, and a second set of criteria relevant to the second heap. Various complex compaction policies can be adopted, but generally it is preferred that the second set of criteria are more sensitive to fragmentation than the first set of criteria. The reason for this is that the first heap can be deleted at the end of a transaction, and so its level of fragmentation is less of a concern than for the second heap which will persist for future transactions. It is preferred that after a compact operation, the first and second heaps are shrunk if possible, thereby returning released storage to said unallocated region. This helps to ensure that free space is available for future storage requests on either heap.

Although a single garbage collector is used for both heaps, the trigger for garbage collection and the type of garbage collection performed can vary between the first and second heaps, such as in accordance with their respective expansion policies. This allows the garbage collection strategy to be tuned to the requirements of each individual heap.

This idea can be extended to only performing garbage collection on one heap at a time. For example, if a transaction is nearly finished, but more space is needed on the second heap, then it may not be necessary to also garbage collect the first heap, since this will soon be deleted. Likewise different garbage collection techniques (such as mark-sweep and copy garbage collection) can be used on different heaps, depending on their particular requirements.

In the preferred embodiment, the system further includes a bit array, having one bit for each possible object location in said portion of storage. The bit is used to provide a quick indication of whether or not there is an object currently stored at the corresponding object location, which is useful in operations such as garbage collection The invention further provides a method of operating a computer system providing an object-based environment, said computer system including storage, a contiguous linear portion of which is logically divided into first and second heaps located at opposite ends of the storage portion, with any gap between the two heaps representing an unallocated region of storage, wherein references are permitted from objects on the first heap to objects on the second heap and vice versa, said method comprising the steps of:

operating a garbage collector across both heaps to remove objects that are no longer live;

expanding the first heap into said unallocated region according to a first expansion policy; and for expanding the second heap into said unallocated region according to a second expansion policy.

The invention further provides a computer program product comprising instructions encoded on a computer readable medium for causing a computer to perform the method described above. A suitable computer readable medium may be a DVD or computer disk, or the instructions may be encoded in a signal transmitted over a network from a server.

It will be appreciated that the method and computer program product of the invention will benefit from the same preferred features as the system of the invention.

BRIEF DESCRIPTION OF THE DRAWINGS

A preferred embodiment of the invention will now be described in detail by way of example only with reference to the following drawings.

DETAILED DESCRIPTION

Figure 1:
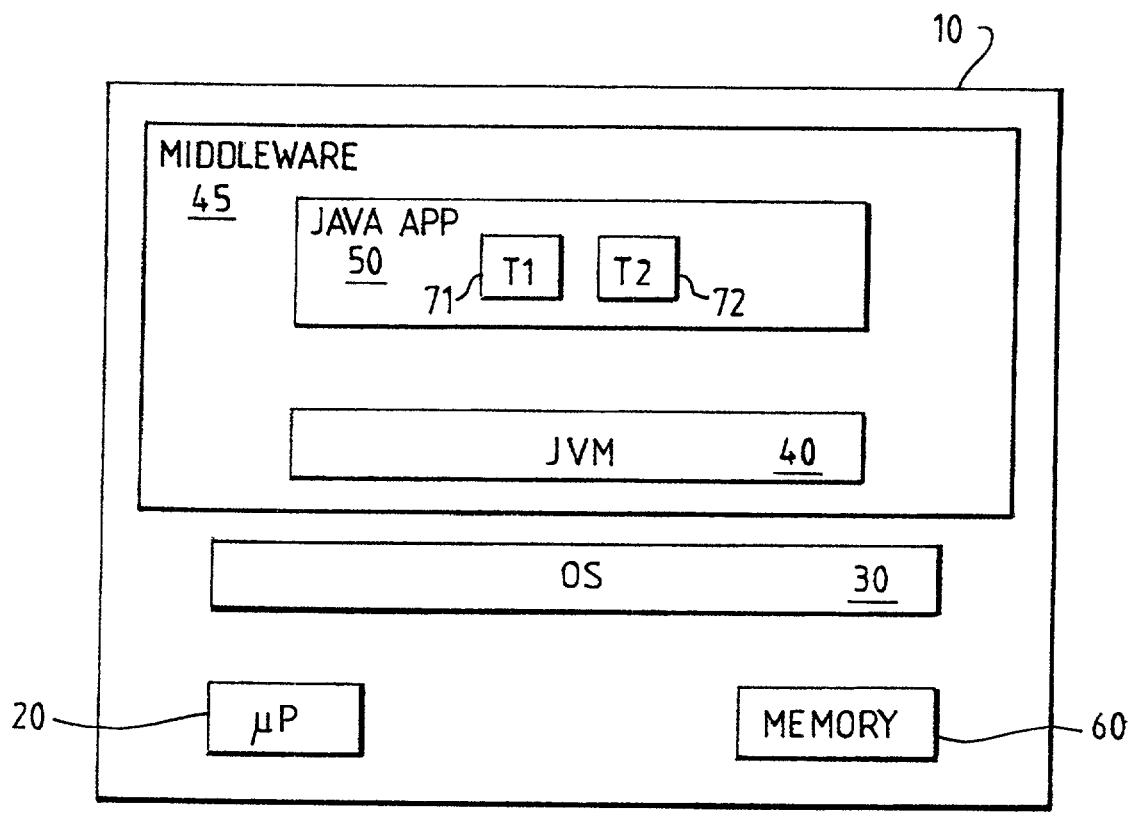
FIG. 1 shows a schematic diagram of a computer system supporting a Java Virtual Machine (JVM)

FIG. 1 illustrates a computer system 10 including a (micro)processor 20 which is used to run software loaded into memory 60. The software can be loaded into the memory by various means (not shown), for example from a removable storage device such as a floppy disk, CD ROM, or DVD, or over a network such as a local area network (LAN), telephone/modem connection, or wireless link, typically via a hard disk drive (also not shown). Computer system runs an operating system (OS) 30, on top of which is provided a Java virtual machine (JVM) 40. The JVM looks like an application to the (native) OS 30, but in fact functions itself as a virtual operating system, supporting Java application 50. A Java application may include multiple threads, illustrated by threads T1 and T2 71, 72.

System 10 also supports middleware subsystem 45, for example a transaction processing environment such as CICS, available from IBM Corporation (CICS is a trademark of IBM Corporation). The middleware subsystem runs as an application or environment on operating system 30, and initiates the JVM 40. The middleware also includes Java programming which acts to cause transactions as Java applications 50 to run on top of the JVM 40. In accordance with the present invention, and as will be described in more detail below, the middleware can cause successive transactions to run on the same JVM. In a typical server environment, multiple JVMs may be running on computer system 10, in one or more middleware environments.

It will be appreciated that computer system 10 can be a standard personal computer or workstation, network computer, minicomputer, mainframe, or any other suitable computing device, and will typically include many other components (not shown) such as display screen, keyboard, sound card, network adapter card, etc which are not directly relevant to an understanding of the present invention. Note that computer system 10 may also be an embedded system, such as a set top box, handheld device, or any other hardware device including a processor 20 and control software 30, 40.

Figure 2:
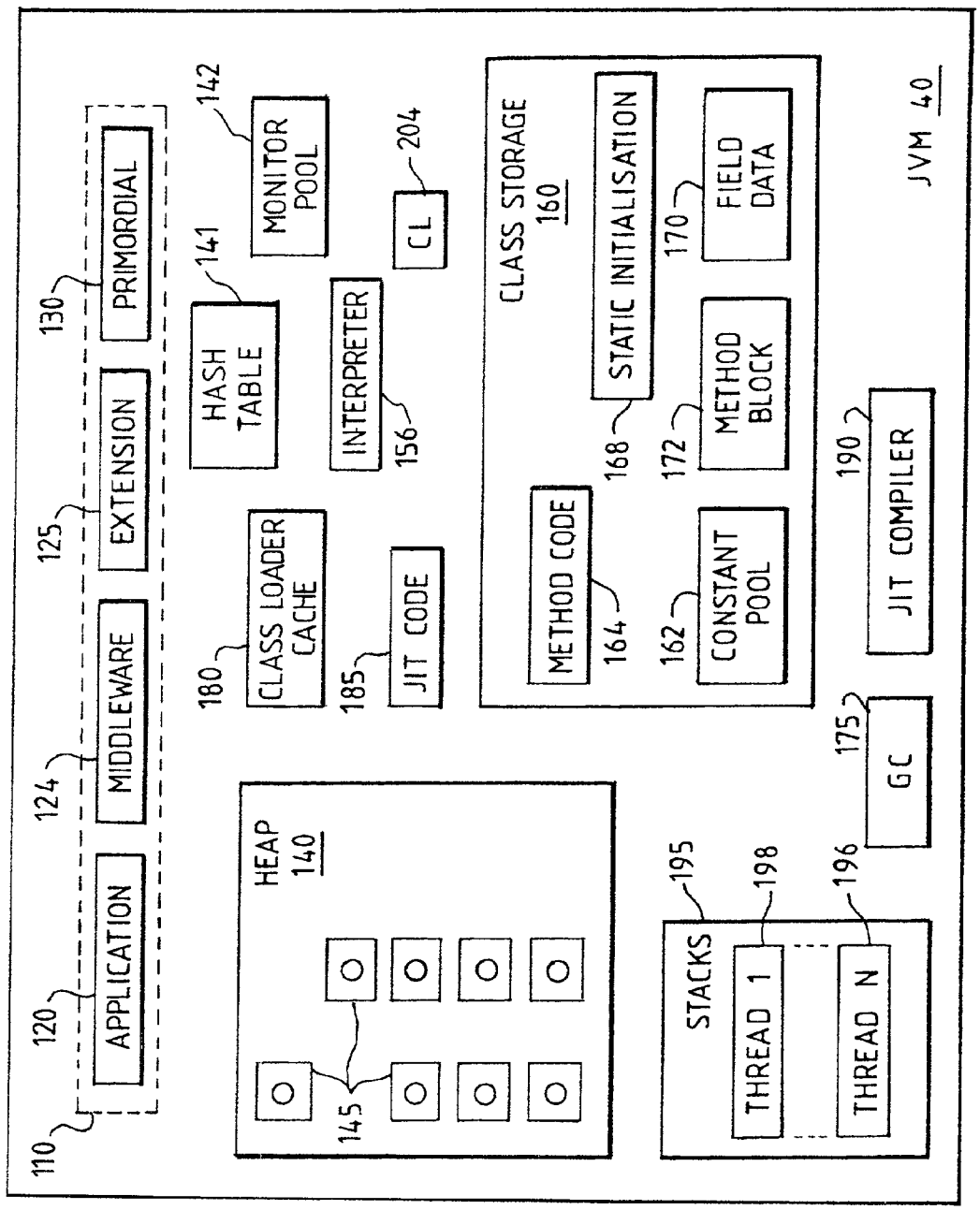
FIG. 2 is a schematic diagram of the internal structure of the JVM.

FIG. 2 shows the structure of JVM 40 in more detail (omitting some components which are not directly pertinent to an understanding of the present invention). The fundamental unit of a Java program is the class, and thus in order to run any application the JVM must first load the classes forming and required by that application. For this purpose the JVM includes a hierarchy of class loaders 110, which conventionally includes three particular class loaders, named Application 120, Extension 125, and Primordial 130. An application can add additional class loaders to the JVM (a class loader is itself effectively a Java program). In the preferred embodiment of the present invention, a fourth class loader is also supported, Middleware 124.

For each class included within or referenced by a program, the JVM effectively walks up the class loader hierarchy, going first to the Application class loader, then the Middleware loader, then the Extension class loader, and finally to the Primordial class loader, to see if any class loader has previously loaded the class. If the response from all of the class loaders is negative, then the JVM walks back down the hierarchy, with the Primordial class loader first attempting to locate the class, by searching in the locations specified in its class path definition. If this is unsuccessful, the Extension class loader then makes a similar attempt, if this fails the Middleware class loader tries. Finally, if this fails the Application class loader tries to load the class from one of the locations specified in its class path (if this fails, or if there is some other problem such as a security violation, the system returns an error). It will be appreciated that a different class path can be defined for each class loader.

Note that if it is desired to load a further middleware class loader (i.e. one provided by the user rather than included within the JVM itself), then this can be achieved by declaring that the new class loader implements the middleware interface. This declaration by itself is sufficient for the JVM to treat it as a middleware class loader—no other method definitions or such-like are required.

The JVM further includes a component CL 204, which also represents a class loader unit, but at a lower level. In other words, this is the component that actually interacts with the operating system to perform the class loading on behalf of the different (Java) class loaders 110.

Also present in the JVM is a heap 140, which is used for storage of objects 145 (FIG. 2 shows the heap 140 only at a high level; see FIG. 5 below for more details). Each loaded class represents an object, and therefore can be found on the heap. In Java a class effectively defines a type of object, and this is then instantiated one or more times in order to utilise the object. Each such instance is itself an object which can be found in heap 140. Thus the objects 145 shown in the heap in FIG. 2 may represent class objects or other object instances. (Note that strictly the class loaders as objects are also stored on heap 140, although for the sake of clarity they are shown separately in FIG. 2). Although heap 140 is shared between all threads, typically for reasons of operational efficiency, certain portions of heap 140 can be assigned to individual threads, effectively as a small region of local storage, which can be used in a similar fashion to a cache for that thread.

The JVM also includes a class storage area 160, which is used for storing information relating to the class files stored as objects in the heap 140. This area includes the method code region 164 for storing byte code for implementing class method calls, and a constant pool 162 for storing strings and other constants associated with a class. The class storage area also includes a field data region 170 for sharing static variables (static in this case implies belonging to the class rather than individual instances of the class, or, to put this another way, shared between all instances of a class), and an area 168 for storing static initialisation methods and other specialised methods (separate from the main method code 164). The class storage area further includes a method block area 172, which is used to store information relating to the code, such as invokers, and a pointer to the code, which may for example be in method code area 164, in JIT code area 185 (as described in more detail below), or loaded as native code such as C, for example as a dynamic link library (DLL).

Classes stored as objects 145 in the heap 140 contain a reference to their associated data such as method byte code etc in class storage area 160. They also contain a reference to the class loader which loaded them into the heap, plus other fields such as a flag (not shown) to indicate whether or not they have been initialised.

FIG. 2 further shows a monitor pool 142. This contains a set of locks (monitors) that are used to control access to an object by different threads. Thus when a thread requires exclusive access to an object, it first obtains ownership of its corresponding monitor. Each monitor can maintain a queue of threads waiting for access to any particular object. Hash table 141 is used to map from an object in the heap to its associated monitor.

Another component of the JVM is the interpreter 156, which is responsible for reading in Java byte code from loaded classes, and converting this into machine instructions for the relevant platform. From the perspective of a Java application, the interpreter effectively simulates the operation of a processor for the virtual machine.

Also included within the JVM are class loader cache 180 and garbage collection (GC) unit 175. The former is effectively a table used to allow a class loader to trace those classes which it initially loaded into the JVM. The class loader cache therefore allows each class loader to check whether it has loaded a particular class—part of the operation of walking the class loader hierarchy described above. Note also that it is part of the overall security policy of the JVM that classes will typically have different levels of permission within the system based on the identity of the class loader by which they were originally loaded.

Garbage collection (GC) facility 175 is used to delete objects from heap 140 when those objects are no longer required. Thus in the Java programming language, applications do not need to specifically request or release memory, rather this is controlled by the JVM. Therefore, when Java application 50 creates an object 145, the JVM secures the requisite memory resource. Then, when Java application 50 finishes using object 145, the JVM can delete the object to free up this memory resource. This latter process is known as garbage collection, and is generally performed by briefly interrupting all threads 71, 72, and scanning the heap 140 for objects which are no longer referenced, and hence can be deleted. The garbage collection of the preferred embodiment is described in more detail below.

The JVM further includes a just-in-time (JIT) compiler 190. This forms machine code to run directly on the native platform by a compilation process from the class files. The machine code is created typically when the application program is started up or when some other usage criterion is met, and is then stored for future use. This improves run-time performance by avoiding the need for this code to be interpreted later by the interpreter 156.

Another component of the JVM is the stack area 195, which is used for storing the stacks 196, 198 associated with the execution of different threads on the JVM. Note that because the system libraries and indeed parts of the JVM itself are written in Java, and these frequently use multi-threading, the JVM may be supporting multiple threads even if the user application 50 running on top of the JVM contains only a single thread itself.

It will be appreciated of course that FIG. 2 is simplified, and essentially shows only those components pertinent to an understanding of the present invention. Thus for example the heap may contain thousands of Java objects in order to run Java application 50, and the JVM contains many other components (not shown) such as diagnostic facilities, etc.

Figure 3:
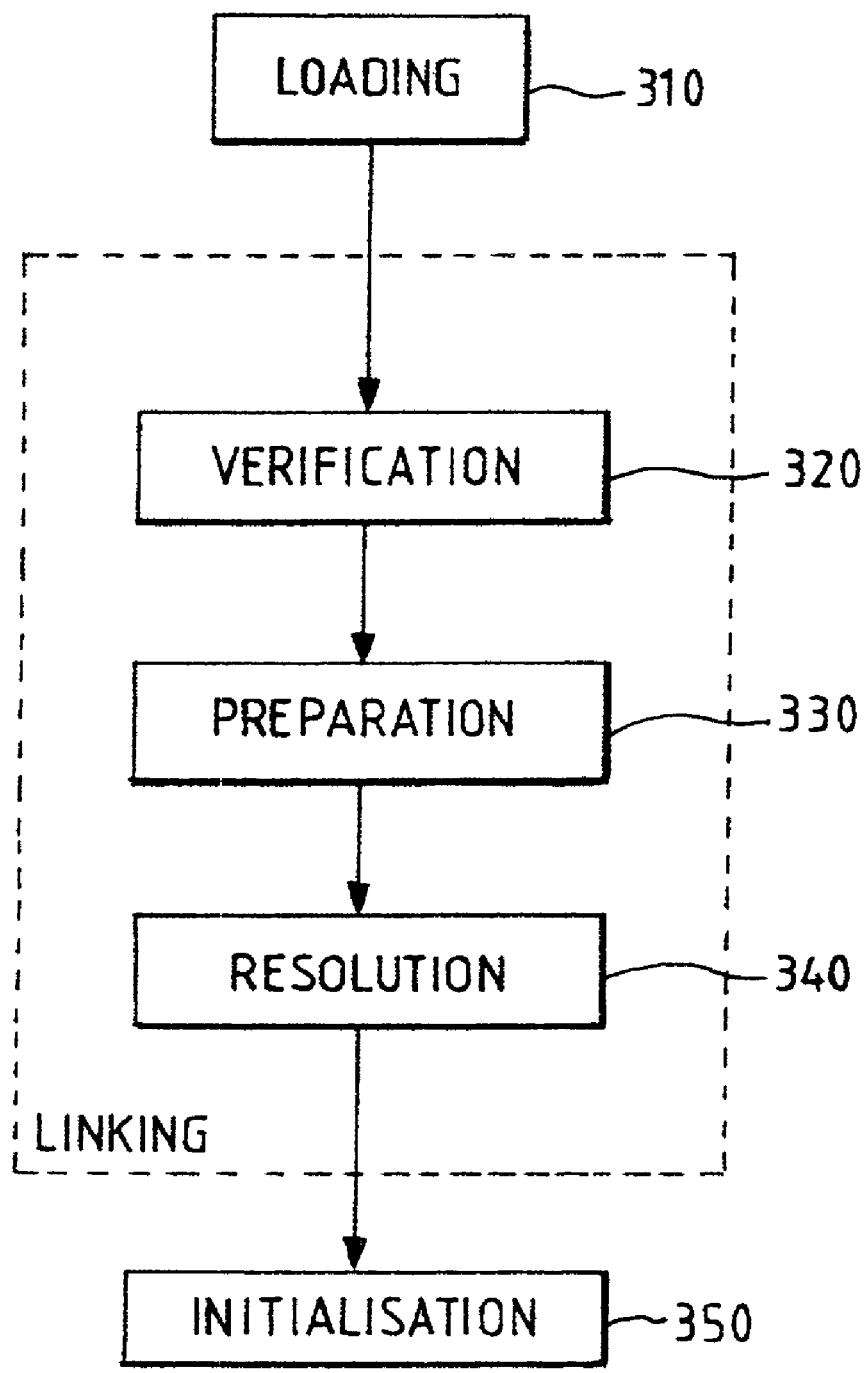
FIG. 3 is a flowchart depicting the steps required to load a class and prepare it for use.

FIG. 3 is a flowchart illustrating the operations conventionally performed to load a class in order to run a Java application. The first operation is loading (step 310) in which the various class loaders try to retrieve and load a particular class. The next operation is linking, which comprises three separate steps. The first of these is verification (step 320), which essentially checks that the code represents valid Java programming, for example that each instruction has a valid operational code, and that each branch instruction goes to the beginning of another instruction (rather than the middle of an instruction). This is followed by preparation (step 330) which amongst other things creates the static fields for a class. The linking process is completed by the step of resolution, in which a symbolic reference to another class is typically replaced by a direct reference (step 340).

At resolution the JVM may also try to load additional classes associated with the current class. For example, if the current class calls a method in a second class then the second class may be loaded now. Likewise, if the current class inherits from a superclass, then the superclass may also be loaded now. This can then be pursued recursively; in other words, if the second class calls methods in further classes, or has one or more superclasses, these too may now be loaded. Note that it is up to the JVM implementation how many classes are loaded at this stage, as opposed to waiting until such classes are actually needed before loading them.

The final step in FIG. 3 is the initialisation of a loaded class (step 350), which represents calling the static initialisation method (or methods) of the class. According to the formal JVM specification, this initialisation must be performed once and only once before the first active use of a class, and includes things such as setting static (class) variables to their initial values (see the above-mentioned book by Lindholm and Yellin for a definition of "first active use"). Note that initialisation of an object also requires initialisation of its superclasses, and so this may involve recursion up a superclass tree in a similar manner to that described for resolution. The initialisation flag in a class object 145 is set as part of the initialisation process, thereby ensuring that the class initialisation is not subsequently re-run.

The end result of the processing of FIG. 3 is that a class has been loaded into a consistent and predictable state, and is now available to interact with other classes. In fact, typically at start up of a Java program and its concomitant JVM, some 1000 objects are loaded prior to actual running of the Java program itself, these being created from many different classes. This gives some idea of the initial delay and overhead involved in beginning a Java application.

Figure 4:
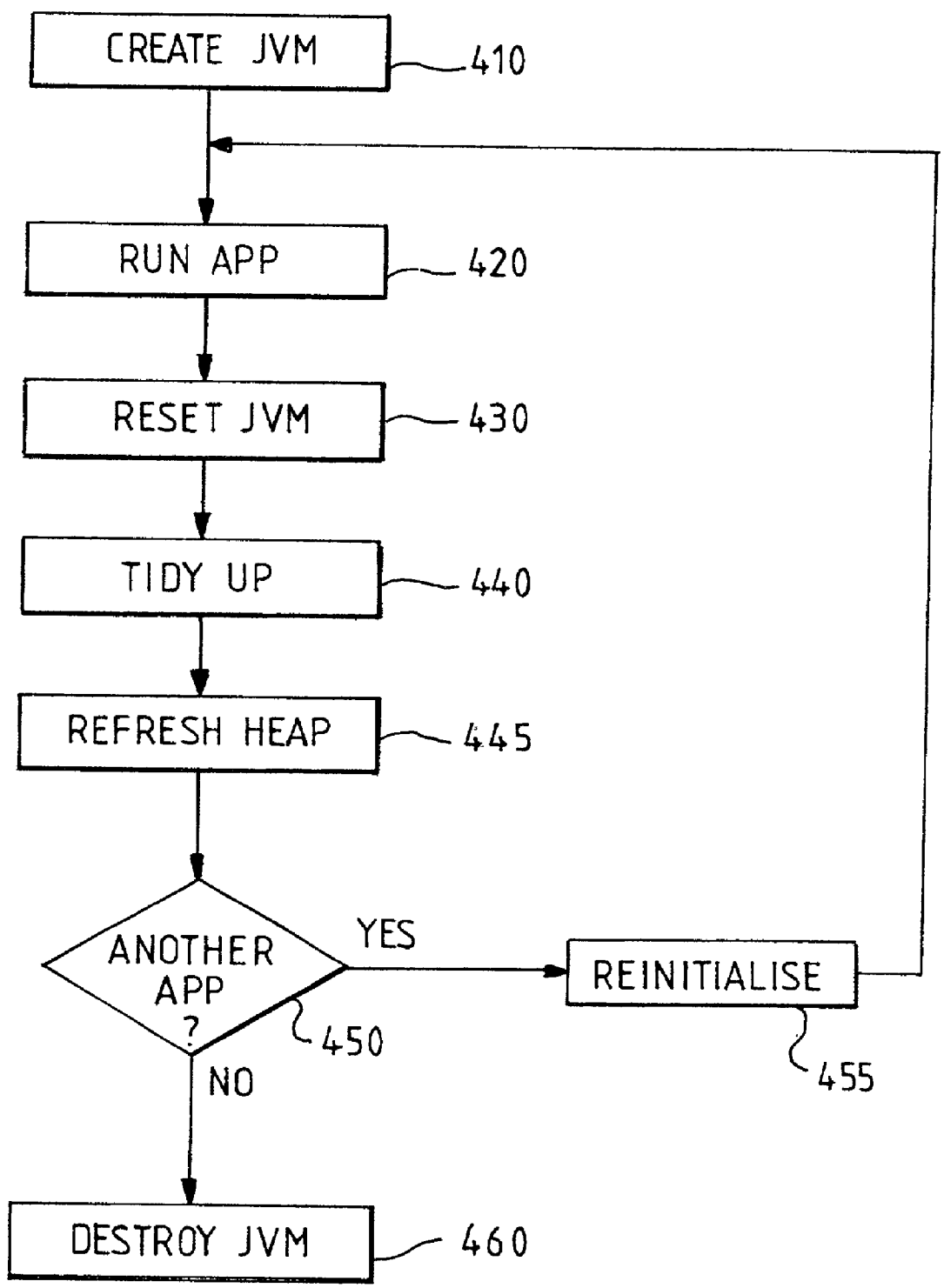
FIG. 4 is a flowchart depicting at a high level the serial reuse of a JVM.

As mentioned above, the problems caused by this initial delay can be greatly reduced by serial reuse of a JVM, thereby avoiding the need to reload system classes and so on. FIG. 4 provides a high-level flowchart of a preferred method for achieving such serial reuse. The method commences with the start of the middleware subsystem 45, which in turn uses the Java Native Interface (JNI) to perform a Create JVM operation (step 410). Next an application or transaction to run on the JVM is loaded by the Application class loader 120. The middleware includes Java routines to provide various services to the application, and these are also loaded at this point, by the Middleware class loader 124.

The application can now be run (step 420), and in due course will finally terminate. At this point, instead of terminating the JVM as well as the application, the middleware subsystem makes a Reset JVM call to the JVM (step 430). The middleware classes may optionally include a tidy-up method and/or a reinitialize method. Both of these are static methods. The JVM responds to the Reset JVM by calling the tidy-up method of the middleware classes (step 440). The purpose of this is to allow the middleware to leave the JVM in a tidy state, for example removing resources and closing files that are no longer required, and deleting references to the application objects. In particular, all those middleware classes which have been used since the previous JVM reset (or since the JVM was created if no resets have occurred) have their tidy-up method called, assuming of course that they have a tidy-up method (there is no requirement for them to have such a tidy-up method).

The tidy-up method may be similar to the finalise method of a class, which is a standard Java facility to allow an object to perform some close-down operation. However, there is an important difference in that tidy-up is a static method. This means that contrary to the finalise method it applies to the class rather than any particular object instance, and so will be called even if there are no current object instances for that class. In addition the timing of the tidy-up method is different from finalise, in that the former is called in response to a predetermined command to reset the JVM. In contrast, in accordance with the JVM specification, the finalise method is only triggered by a garbage collection. More particularly, if an object with a finalizer method is found to be unreachable during a garbage collection (i.e. it is no longer effectively active) then it is queued to the finalizer thread, which then runs the finalizer method after the garbage collection is completed. Note that the finalizer method of an object may never be called, if an application finishes and the JVM shuts down without the system needing to perform a garbage collection.

Once the tidy-up has been completed, a refresh heap operation is performed (step 445). As will be described in more detail below, this deletes those portions of the heap that relate to the application or transaction that has just been completed, generally analogous to a garbage collection cycle. Note that many of the objects deleted here might not have been removable prior to the tidy-up method, since they could still have been referenced by the middleware classes.

At this point, the middleware subsystem makes a determination of whether or not there is another application to run on the JVM (step 450). If not, the middleware subsystem uses the JNI to make a Destroy JVM call (step 460) which terminates the JVM, thereby ending the method of FIG. 4. If on the other hand there is another application to run, then this new application is started by the middleware. The system responds to this new application by calling in due course the reinitialisation method in each of the middleware classes to be reused (step 455). The purpose of this is to allow the middleware classes to perform certain operations which they might do at initialisation, thereby sidestepping the restriction that the JVM specification prevents the initialisation method itself being called more than once. As a simple example, the reinitialisation may be used to reset a clock or a counter. As shown in FIG. 4, the system is now in a position to loop round and run another application (step 420).

It is generally expected that the reinitialisation method will be similar in function to the initialisation method, but there may well be some differences. For example, it may be desired to reset static variables which were initialised implicitly. Another possibility is to allow some state or resources to persist between applications; for example, if a class always outputs to one particular log file which is set up by the initialisation method, it may be more efficient to keep this open in between successive JVMs, transparent to the application.

It should be noted that whilst FIG. 4 indicates the distinct logical steps performed by the method of the invention, in practice these steps are not all independent. For example, calling the tidy-up methods (step 440) is part of the overall reset JVM operation (step 430). Likewise, calling the reinitialisation methods (step 455) is effectively part of the start-up processing of running the new application (step 420). Thus reinitialisation is performed prior to first active use of a class, and this may occur at any stage of a program. Therefore class reinitialisation (like conventional initialisation) is not necessarily completed at start-up of the program, but rather can be regarded as potentially an ongoing process throughout the running of a program.

It will also be appreciated that there is some flexibility with regard to the ordering of the steps shown in FIG. 4. In particular, the decision of whether or not there is to be another application (step 450) could be performed earlier, such as prior to the refresh heap step, the tidyup step, and/or the reset JVM step. In the latter case, which corresponds to immediately after the first application has concluded (i.e. straight after step 420), the alternative outcomes would be to destroy the JVM (step 460) if there were no further applications, or else to reset the JVM, tidy up, refresh the heap, and reinitialise (steps 430, 440, 445, and 455) if there were further applications. If instead the decision step 450 is intermediate these above two extreme positions, the logic flow can be determined accordingly. Further details about the implementation of the tidyup and reinitialise methods are provided in above-mentioned U.S. patent application Ser. No. 09/584,641.

It should be noted that in the preferred embodiment, the ability to reset the JVM, and to have tidyup and reinitialise methods, is only available for middleware classes (i.e. those loaded by the middleware class loader). This is to allow the middleware classes to be re-used by successive applications or transactions, for which they can perform various services. The basis for this approach is that typically the middleware is a relatively sophisticated and trusted application, and so can be allowed to take responsibility for proper implementation of the tidy-up and reinitialise methods. On the other hand, the transactions that run within the middleware are not treated as reliable. Note also that the system classes themselves do not have tidyup or reinitialisation methods, despite persisting across a JVM reset. Rather, if the middleware makes any change to a system class, then the middleware itself is expected to take the necessary action (if any) for a reset with respect to the system class as part of the middleware's own tidyup operation.

An important part of the reset JVM/tidyup operation (steps 430 and 440) in the preferred embodiment is to make sure that the JVM is in a state which is amenable to being tidied up. If this is the case, the JVM is regarded as being clean, if not, it is regarded as being dirty or contaminated.

Considering this in more detail, if the application has performed certain operations, then it will not be possible for the middleware classes to be certain that their tidy-up and reinitialise methods will fully reset the system to a fresh state. With such a contaminated JVM, the system still calls the tidy-up methods of the class objects as per normal (step 440), but the return code back to the middleware associated with the reset JVM operation (step 430) effectively indicates failure. The expectation here is that the JVM would actually be terminated by the middleware subsystem at this point, as it is no longer in a predictable condition.

One important situation which would prevent the JVM from being able to properly reset is where the application has performed certain operations directly such as making security or environment changes, running native code, or performing Abstract Windowing Toolkit (AWT) operations. These affect the state of the JVM or the underlying computer system and cannot be reliably tidied up by the middleware, for the simple reason that the middleware does not necessarily know about them. Such changes could then persist through a reset JVM call, and contaminate the JVM for any future applications. In contrast, if an application performs such operations through a middleware call, then this does not cause any problems, because the middleware now does know about the situation and so can perform whatever tidyup measures are required.

The JVM thus monitors for operations that may prevent proper reset, including whether they have been performed by an application or middleware. This is determined by the JVM keeping track of its context, which is set to application context for an application class, and to middleware context for a middleware class, whilst a primordial or extension class has no impact on the existing context of application or middleware. In particular, context can be determined based on the type of class which contains the method that is currently being performed, whilst the type of class is determined from its original class loader.

As previously mentioned, the list of problematic operations given above only causes difficulty when performed in an application context, since in a middleware context it is possible for them to be reset by the appropriate tidy-up routines of the relevant middleware classes.

Figure 5:
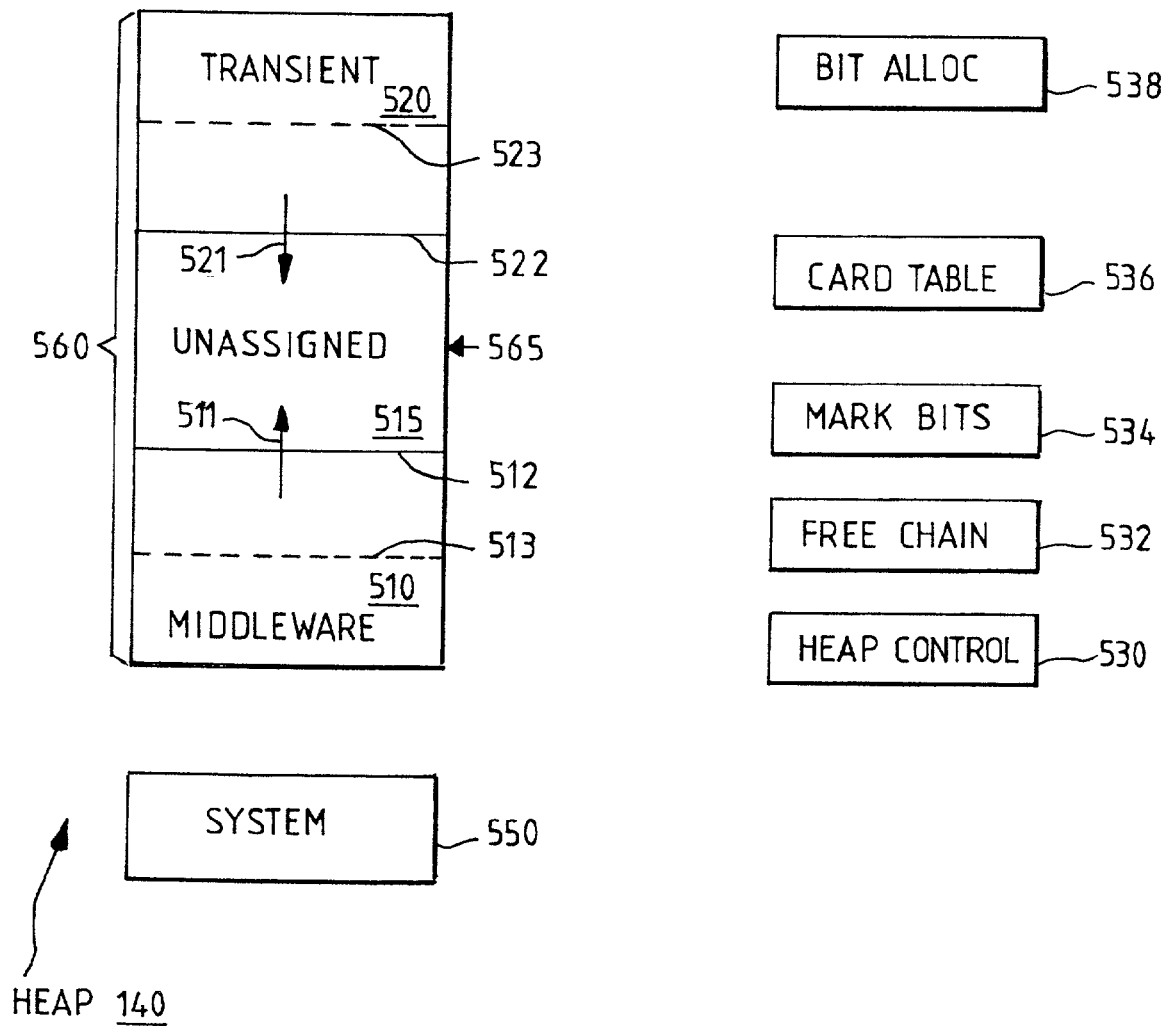
FIG. 5 is a schematic diagram showing the heap and its associated components in more detail.

Referring now to FIG. 5, in the preferred embodiment the heap 140 is logically split into three components (objects in one component can reference objects in another component). In particular, at the bottom (logically) of heap 140 is middleware section 510, and at the top of the heap is transient section 520. The data in these two heaps grows towards each other, thus transient heap grows in the direction of arrow 521, and middleware heap in the direction of arrow 511. The middleware heap is defined by boundary 512, and the transient heap by boundary 522, with unassigned space 515 between them. It should be appreciated that boundaries 512 and 522 represent the maximum size currently assigned to the two heaps, rather than their current fill levels—these are instead shown by dashed lines 513 and 523. In other words, as the middleware heap fills up, the fill level 513 will approach towards middleware heap boundary 512; likewise as the transient heap fills up, the fill level 523 will approach towards transient heap boundary 522. Finally, and separate from the transient heap and middleware heap, is system heap 550. Note that the combined transient and middleware heaps, together with intervening unassigned space, are allocated from a single physically contiguous block of memory 560. In contrast, the system heap 550 may be formed from multiple non-contiguous regions of memory.

In one preferred embodiment, memory 560 comprises 64 MBytes, and the initial size of the middleware and transient heaps is 0.5 Mbyte each. Thus it can be seen that initially the unassigned region 515 dominates, although as will be discussed in detail below, the transient and middleware heaps are allowed to expand into this space. However, these values are exemplary only, and suitable values will vary widely according to machine architecture and size, and also the type of application.

Heap control block 530 is used for storing various information about the heap, such as the location of the heap within memory, and the limits of the transient and middleware sections as defined by limits 512 and 522. Free chain block 532 is used for listing available storage locations within the middleware and transient sections (there is actually one free chain block for each section). Thus although the middleware and transient heaps start to fill sequentially, the likely result of a garbage collection cycle is that space may become available within a previously occupied region. Typically therefore there is no single fill line such as 513, 523 between vacant and occupied space, rather a fragmented pattern. The free chain block is a linked list which specifies the location and size of empty regions within that section of the heap. It is quick to determine whether and where a requested amount of storage is available in the heap by simply scanning through the linked list. Note that in the preferred embodiment, empty regions in the heap which are below a predetermined size (typically a few hundred bytes) are excluded from the free chain list. This prevents the list from becoming too long through containing a large number of very small vacant regions, although it does mean that these regions effectively become inaccessible for storage (although they can be retrieved later, as described in more detail below).

The transient heap 520 is used for storing objects having no expected currency beyond the end of the application or transaction, including application object instances, and primordial object instances and arrays created by application methods (arrays can be regarded as a specialised form of object). Since the lifetime of such objects is commensurate with the application itself, it should be possible to delete all the objects in the transient heap at the end of the application. The application class objects are also on the transient heap. In contrast, the middleware heap 510 is used for storing objects which have a life expectancy longer than a single transaction, including middleware object instances, and primordial object instances and arrays created by middleware methods. In addition, string objects and arrays for strings interned in the Interned String Table are also stored in the middleware heap (the Interned String Table is a tool whereby if multiple identical strings are to be stored on the heap, it is possible to store only one copy of the string itself, which can then be referenced elsewhere). Lastly, the system heap 550 is used for storing primordial class objects and reusable class objects, where the term reusable class object is used to denote a class which can be used again after JVM reset.

The type of class is dependent on the class loader which originally loaded it, in other words a middleware class and an application class are loaded by the middleware class loader 124 and the application class loader 120 respectively. For the purposes of the present discussion, primordial classes can be considered as classes loaded by the Primordial or Extensions class loader (130 and 125 respectively in FIG. 2). In the preferred embodiment, classes loaded by the middleware class loader are automatically regarded as reusable.

It is clear from above that instances of primordial classes, such as the basic string class java/lang/String, can be located either in the middleware heap or the transient heap, depending on the method which created them. In a preferred embodiment of the present invention, the determination of where to place such primordial class instances is based on the current context described above (also referred to as method-type). Thus if a method belonging to an application class is invoked, the context or method-type becomes Application, whilst if a method belonging to a middleware class is invoked, the method-type becomes Middleware. Finally, if a method belonging to a primordial class is invoked, the method-type is unchanged from its previous value. The context or method-type is stored in the Java frame for the method (which is stored on stack 195—see FIG. 2); at the completion of the method, the method-type reverts to its value at the time the method was invoked, which was stored in the previous frame.

It should be noted that for the above purpose a method belongs to the class that actually defines it. For example, if class A subclasses class B, but does not override method C, then method C belongs to class B. Therefore the method-type is that of class B, even if method C is being run for an instance of class A. In addition, the reason for tracking method-type on a per-thread basis is that it is possible for various threads within an application to be executing different methods having different context.

The transient region of the heap, containing objects created by the application or transaction, is subject to normal garbage collection, but the intention is that it will be sufficiently large that this is unlikely to occur within the lifetime of a typical application. At the end of each application, the transient region of the heap is reset. (The repetition of this pattern will thereby avoid having to perform garbage collection during most typical applications). In contrast the middleware region generally contains objects created by the trusted middleware. It is again subject to conventional garbage collection, although in a transaction environment it is expected that the majority of objects will be created in the transient heap, so that garbage collection is not expected to occur frequently. Moreover the system typically tries to perform garbage collection of the middleware heap at the same time as reset of the transient heap, in other words between rather than during transactions (this is discussed in more detail below). The middleware heap is not cleared between applications, but rather remains to give the middleware access to its persistent state (it is assumed that the middleware can take responsibility for resetting itself to the correct state to run the next application).

The preferred embodiment is actually somewhat more complicated than described above, in that it supports two types of application class loader, one of which is for standard application classes, the other for reusable application classes. The motivation here is that when the next transaction is to run, it will in fact require many of the same application classes as the previous transaction. Therefore it is desirable to retain some application system classes rather than having to reload them, although certain additional processing is required to make them look newly loaded to the next transaction. Conversely it would be possible to have a second middleware class loader which is for non-reusable middleware classes. In the former situation the reusable application classes are treated essentially in the same manner as the reusable middleware classes, (e.g. loaded into the system heap); in the latter situation the non-reusable middleware classes would be treated similarly to the non-reusable application classes but loaded into the middleware heap (since they may exist after the conclusion of a transaction, even if they do not endure for the next transaction). However, for present purposes in order to explain the invention more clearly, it will be assumed that all the middleware classes are reusable, and that none of the application classes are reusable.

The introduction of multiple heaps for different types of objects allows the handling of the heap to be fine-tuned to the requirements of those types of object. For example, it may be desirable for the transient heap to allocate a larger thread local heap cache. In addition, utilising a single block of memory for the transient and middleware heaps improves space usage, in that a given region of memory can be flexibly assigned to either the transient or middleware heap, depending on particular application requirements. On the other hand it does lead to some complications in terms of heap management, especially as regards control of heap size. Thus in simple terms, as more and more objects are created, there is a choice to either enlarge the size of the heap, or to perform a garbage collection to maintain the heap within current size limits. The former option is generally quick, but will eventually lead to the exhaustion of heap space; in contrast, a garbage collection is relatively slow, since it interrupts processing, but does constrain the heap size to within predetermined limits. Overall, the preferred embodiment tries to avoid garbage collections during transactions as much as possible, thereby optimising performance for the transaction, and to rely instead on the heap refresh described below, which is performed at the end of the transaction as part of the JVM reset.

Figure 6A:
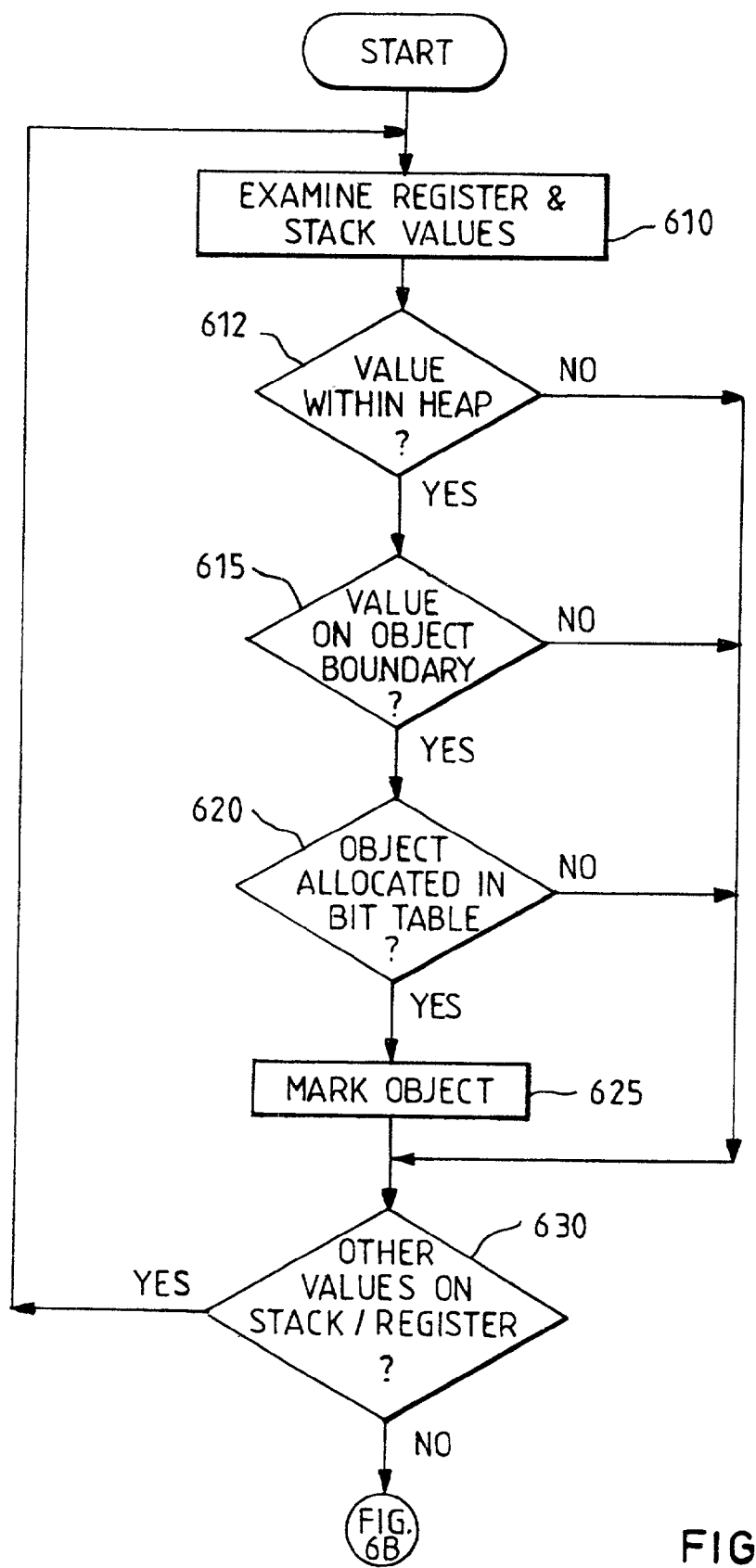
FIGS. 6A and 6B form a flowchart illustrating garbage collection.
Figure 6B:
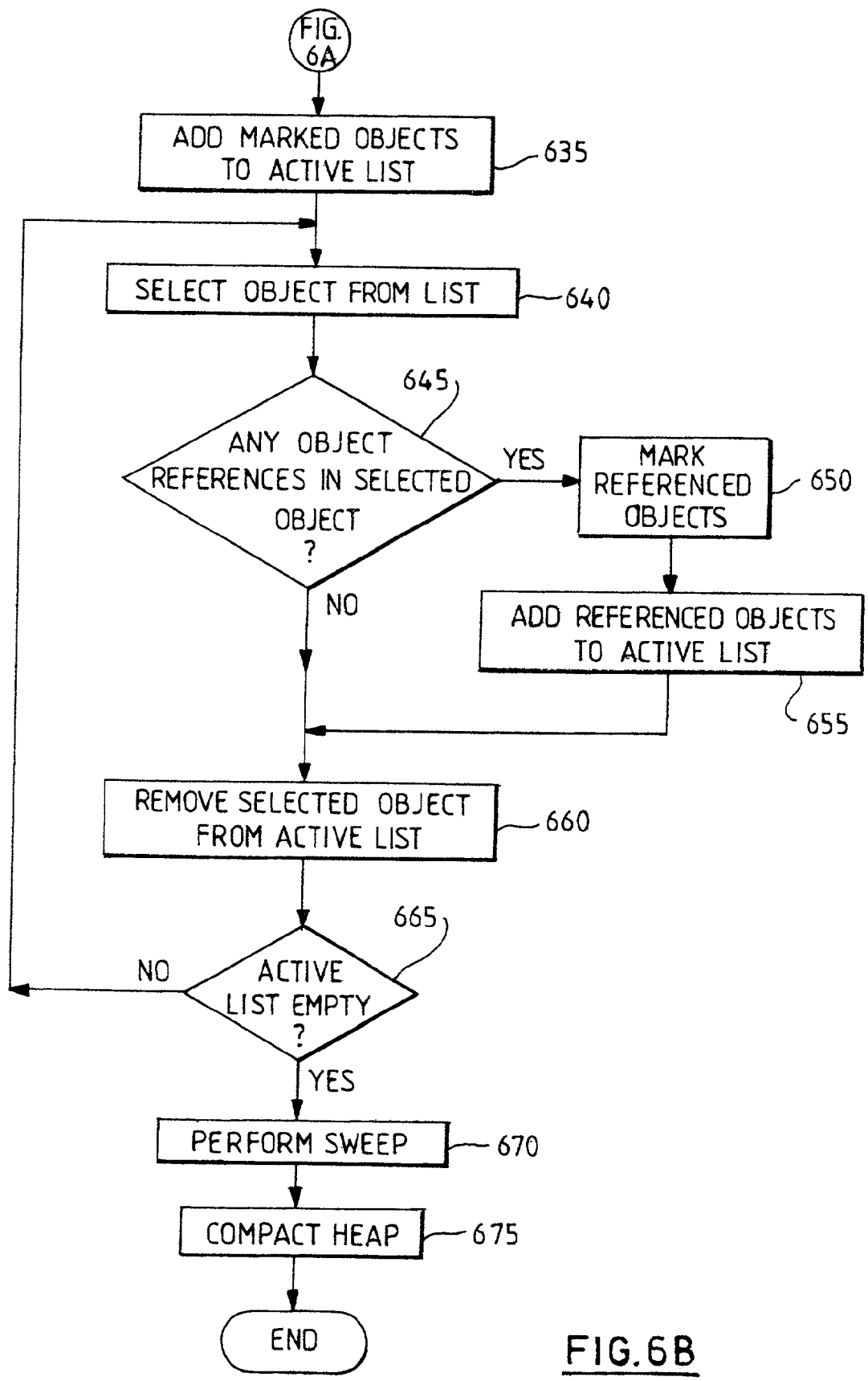

More specifically, the policy for expansion and garbage collection in terms of system heap 550 is straightforward, in that objects in this heap are never garbage collected; rather this heap simply expands to accommodate all relevant class objects. However, the policy for transient and middleware heaps is more complex, because these two heaps are interdependent, in that they share the same memory space. In order to better understand this policy, it will be helpful to firstly review in more detail the garbage collection strategy of the preferred embodiment, as shown in FIGS. 6A and 6B. In particular, the method involves firstly a mark phase, which marks all objects in the heap that are currently in use (known as live or active objects), and secondly a sweep phase, which represents the actual deletion of objects from the heap. Note that general background on garbage collection algorithms can be found in "Garbage Collection: Algorithms for Automatic Dynamic Memory Management" by R Jones and R Lins, Wiley, 1996 (ISBN 0 471 94148 4), whilst one implementation for garbage collection in a system having multiple heaps is described in: "A customisable memory management framework for C++" by G Attardi, T Flagella, and P Iglio, in Software Practice and Experience, vol 28/11, 1998.

As shown in FIG. 6A, the method starts with a review of the registers and stack, both the Java stack, as shown in FIG. 2, and also the C stack, (assuming that the JVM 40 is running as a C application on OS 30, see FIG. 1) (step 610). Each thirty-two bit data word (for a 32-bit system) contained therein could represent anything, for example a real number, or part of a string, but it is assumed at least initially that it may denote a 32 bit reference to an object location in the heap. To firm up on this assumption, three tests are made. Firstly, it is tested whether or not the number references a location within the heap (step 612); if not then the number cannot represent an object reference. Secondly, in the preferred embodiment, all objects commence on an 8-byte boundary. Thus if the location corresponding to the data word from the stack/register does not fall on an object boundary (tested at step 615), then the original assumption that the data/number represents a reference to the heap must again be rejected. Thirdly, in the preferred embodiment, a table 538 is maintained (see FIG. 5) which has a bit for each object location in the heap; this bit is set to unity if there is an object stored at that location, and zero if no object is stored at that location (the relevant bit is updated appropriately whenever an object is created, deleted, or moved). If the data word from the stack/register corresponds to an object location for which the bit is zero, in other words, no object at that location, then once more the original assumption that the data/number represents a reference to the heap must be rejected (step 620). If the data word passes all three of the tests of steps 612, 615 and 620, then there are three remaining possibilities: (a) the word references an object on the heap; (b) the word is an integer that happens to have the same value as the object reference; or (c) the word is a previous value from uninitialized storage. As a conservative measure, it is assumed that option (a) is correct, and so the object is marked as live (step 625). A special array of bits is provided (block 534, see FIG. 5), one bit per object, in order to store these mark bits. If there remain other values on the stacks/registers to test (step 630), the method then loops back to examine these in the same manner as just described; if not the first stage of the mark process is complete.

In the second stage of the mark process, shown in FIG. 6B, the objects marked as live are copied onto a list of active objects (step 635) (in the preferred embodiment objects are actually copied to the active list when originally marked, ie at the same time as step 625 in FIG. 6A). An object from this list is then selected (step 640), and examined to see if it contains any references (step 645). Note that this is a reasonably straightforward procedure, because the structure of the object is known from its corresponding class file, which defines the relevant variables to be used by the object. Any objects referenced by the selected object are themselves marked (step 650) and added to the active list (step 655). Next, the selected object is removed from the active list (step 660), and then a test is performed (step 665) to determine if the active list is empty; if not, processing loops back to step 640 to select another object from the active list. Finally, when step 665 produces a positive outcome, all objects that are active, because they are referenced directly or indirectly from the stacks or registers, have been appropriately marked.

The mark stage is then followed by a sweep stage (step 670) and a compact stage (step 675). The former garbage collects (i.e. deletes) all those objects which have not been marked, on the basis that they are no longer reachable from any live or active object. In particular, each object which is not marked as active has its corresponding bit set to zero in table 538 (see FIG. 5). Runs of zeros in the bit allocation table 538 are now identified; these correspond to some combination of the object immediately preceding the run, which may extend into the run (since only the head of an object is marked in the bit allocation table), and free space (released or never filled). The amount of free space in the run of zeros can be determined by examining the size of the object immediately preceding the run. If the amount of free space exceeds the predetermined minimum amount mentioned earlier, then the run is added to the free chain list 532 (see FIG. 5).

Over time, such sweeping will tend to produce many discontinuous vacant regions within the heap, corresponding to the pattern of deleted objects. This does not represent a particularly efficient configuration, and in addition there will be effective loss of those pieces of memory too small to be on the free list. Hence a compact stage (step 675) can be performed, which acts to squeeze together those objects which remain in the heap after the sweep in order to amass them into a single continuous block of storage (one for the transient heap, one for the middleware heap). Essentially, this means relocating objects from their initial positions in the heap, to a new position so that, as much as possible, they are all adjacent to one another. As part of this compaction, the very small regions of memory too small to be on the free chain 532 (see FIG. 5) should be aggregated into larger blocks that can be recorded in the free chain.

An important requirement of the object relocation of the compaction step is of course that references to a moved object are altered to point to its new location. This is a relatively straightforward operation for object references on the heap itself, since as previously mentioned, they can be identified from the known structure of each object, and updated to the appropriate new value. However, there is a problem with objects which are directly referenced from a register or stack. As discussed above, each number in the register/stack is treated for garbage collection purposes as if it were an object reference, but there is no certainty that this is actually the case; rather the number may represent an integer, a real number, or any other piece of data. It is therefore not possible to update any object references on the stack or register, because they may not in fact be an object reference, but rather some other piece of program data, which cannot of course be changed arbitrarily. The consequence of this is that it is impossible to move an object which appears to be directly referenced from the heap or stack; instead these objects must remain in their existing position. Such objects are informally known as "dozed" objects since they cannot be moved from their current position.

Two other classes of objects which cannot be moved from the heap are class objects, and thread objects (thread objects are control blocks used to store information about a thread). The reason for this is that such objects are referenced from so many other places in the system that it is not feasible to change all these other references. These objects are therefore known as "pinned", since like dozed objects they cannot be moved from their current position.

A consequence of pinned and dozed objects is that a compact process may not be able to accumulate all objects in a heap into a single contiguous region of storage, in that pinned and dozed objects must remain in their original positions. The consequences of this are discussed in more detail below.

Note that in the preferred embodiment, a compact stage (step 675) is not necessarily employed on every garbage collection cycle, unless this is explicitly requested as a user initial set-up option. Rather a compact operation is only performed when certain predetermined criteria are met. For example, as previously indicated a garbage collection can be triggered by a request for storage in the heap that cannot be satisfied. If the request still cannot be satisfied after the sweep step 670, because there is no single block of memory available of sufficient size, then a compact stage is automatically performed, to try and accumulate an adequately-sized storage region.

In the preferred embodiment, the further criteria used for deciding whether to compact are different for the middleware heap and the transient heap. Thus for the transient heap a compaction is performed whenever the amount of free space remaining in the transient heap after the garbage collection is less than 5% of the heap capacity. The idea here is that when space appears to be running out, the compacting should retrieve some additional space from those empty regions too small for the free chain list. On the other hand, for the middleware heap more complex compaction algorithms are used, based for example on when heap fragmentation exceeds certain limits (e.g. in terms of number of fragments), or where the largest block in the free chain list is below a certain size. The rationale here is that the middleware heap is likely to be of relatively long is duration, and so it is worthwhile to try to optimise its overall storage arrangement.

Note that although the triggers for garbage collection and compaction can be different for the middleware and transient heap, when either operation is performed, in the preferred embodiment it is performed on the whole of active storage 560—ie on both the middleware and transient sections simultaneously. This is because interheap references are permitted, and so any marking or compaction operation necessarily involves both heaps. Consequently, once starting a garbage collection or compaction, it is most effecient to do both heaps at the same time.

One complication to the garbage collection described above is that as previously mentioned, Java permits objects to have finalizer methods, which must be run prior to deletion of the object in a garbage collection. In order to manage this requirement, certain additional processing is required (not shown in FIG. 6). Thus when an object is created on the heap that has a finalizer method, a reference to that object is added to a set of finalizer references. At the end of the mark phase of garbage collection, this set of finalizer references is scanned, to detect any objects in the set which are not marked—the resultant group represents the objects which are about to be deleted, and so need to have their finalizer methods run. To accomplish this, objects in this group now need to be marked as live, and their references iteratively traced and also marked as live, in similar fashion as for the main mark phase. The purpose of this is firstly to retain the objects in order to run their finalizer methods, and secondly to retain any other objects which are directly or indirectly referenced by them, so that the finalizer methods run correctly. The finalizer references for objects in this group are removed from the set of finalizer references described above, so that their finalizer method will not be activated by any future garbage collection cycle, and passed to a reference handler. The subsequent processing is asynchronous, and does not occur until main system processing is resumed after the garbage collection has concluded (i.e. after the end of the processing of FIG. 6B). Once the reference handler has restarted, it passes any object finalizer references it received during the garbage collection to a finalizer queue. A separate finalizer thread then runs each entry in the queue in turn, deleting the object reference from the queue after the corresponding finalizer method has been run.

Note that objects referenced by the reference handler or on the finalizer queue are regarded as "live" during a garbage collection process. In other words they are marked along with any other objects which they reference, directly or indirectly. This ensures that objects do not get inadvertently deleted from the finalizer queue, if their wait on this queue exceeds the time to the next garbage collection. (Thus objects in the reference handler and finalizer queue form additional roots for live objects, in addition to those on the stacks and registers as illustrated in FIG. 6; in fact in the preferred embodiment, there are other categories of roots, for example system class files, but the details are not pertinent to an understanding of the present invention).

One potential problem with the handling of finalizer methods described above is that by running them on a dedicated thread (the finalizer thread), the context of the thread will be different from the main application thread, where context here indicates general system properties associated with the thread, such as security permissions. This can be a particular concern in relation to transaction threads, which as previously mentioned are regarded as relatively untrustworthy. Therefore, the preferred embodiment modifies the handling of objects in the transient heap having finalizer methods. If these are located in a garbage collection cycle and are not marked, then as described above they are marked, along with the objects which they reference, directly or indirectly. However, no further processing is done on these objects, in particular, they are not removed from the set of finalizer references, and are not passed to the reference handler. The effect of this is that these object then simply continue to appear to the garbage collection process as normal live objects, and are maintained through each garbage collection cycle. These objects are eventually deleted in the refresh heap step 445 of the JVM reset (see FIG. 4), which will be described in more detail below.

Returning now to the question of allocating heap space from the overall memory region 560, which contains both the middleware and transient sections, the procedure for this is illustrated at a high level in FIG. 7 (at this level the same general policy is used for both the middleware and transient heaps, although as will be seen below, there are some significant differences in the details of their respective policies). The process starts with an allocation request (step 705), typically to store an object on the heap. This causes the free chain block 532 (see FIG. 5) for the relevant heap section to be examined; if there is available space (step 715), then the method proceeds directly to allocating the desired space (step 795), and exits successfully.

On the other hand, if the test of step 715 is negative, then it means that the heap is too full to sustain the new allocation. This is equivalent conceptually to the fill level 513 in FIG. 5 approaching the assigned boundary 512 for the middleware heap, or fill level 523 approaching assigned boundary 522 for the transient heap. In this situation, the system first determines whether it is possible to simply expand the amount of space assigned to the heap (step 725). In simple terms, for the middleware heap this corresponds to moving assigned boundary 512 upwards into the unassigned region 515, thereby taking some of the unassigned storage and allocating it to the middleware heap 510; conversely for the transient heap, boundary 522 is moved downwards. Of course, it is not possible for the middleware heap to encroach into the transient heap or vice versa, so that once the unassigned space 515 has been exhausted, then it is no longer possible to expand the heaps further. In a situation where heap space is available, then a policy is defined to determine the amount of extra space to add to the heap. The general policy in the preferred embodiment is to increase the heap so that there is 30% free space (taking into account the new allocation request). However, a predetermined minimum expansion size is defined (0.5 MByte in the preferred embodiment), so that the expansion is actually 30% or 0.5 MByte, whichever is greater (subject of course to the amount of space available). Likewise, the user may also set a maximum expansion size, which is then used to cap the figure just obtained (providing it does not prevent satisfying the current allocation request). Finally, in the preferred embodiment, heap memory is always assigned/deassigned in units of a predetermined size, which for a 32-bit system is 64 Kbytes for reasons that will be described later. Therefore whatever expansion value is determined based on the 30% expansion, this is adjusted to the appropriate whole number of 64 Kbyte units. Note that in the preferred embodiment, there are further controls on how the different heaps are allowed to expand; these are discussed below in more detail.

After the available expansion space has been determined, it is tested whether there will now be sufficient space to satisfy the allocation request (step 735). If so, the relevant heap is duly expanded (step 785), if not, the method proceeds to step 745, and a garbage collection is performed. It is now checked whether or not this has created sufficient space (step 755); if so, the method proceeds to allocate the requested space (step 795). Note that one minor complexity not shown in FIG. 7 is that the garbage collection (step 745) may perform both a compact operation, and then also try a heap expansion (equivalent to step 785), if these are necessary to obtain the requested space. If on the other hand there is still insufficient space for the allocation request, then as a final measure, it is possible to shrink the other heap (step 765). Thus referring back to FIG. 5, it can be seen that middleware heap could in principle lose the assigned but empty space between boundary 512 and fill level 513, by lowering boundary to fill level 513. The reclaimed space could then be transferred to the transient heap 520 (assuming that it already now extended through the region 515 shown in FIG. 5 as unassigned). Conversely, space could be made available for transfer from the transient heap to the middleware heap by raising boundary 522 towards fill level 523.

Following the shrinkage of the other heap (step 765) a test is now made to see if this has created sufficient space for the allocation request (step 775); if not the system must return an error to the allocation request (step 780) indicating that no space is available. Assuming however that space is available, then the heap for which the allocation request is made can expand (step 785) into the space vacated by the shrinkage of the other heap, thereby allowing the allocation request to be satisfied (step 795).

Figure 7:
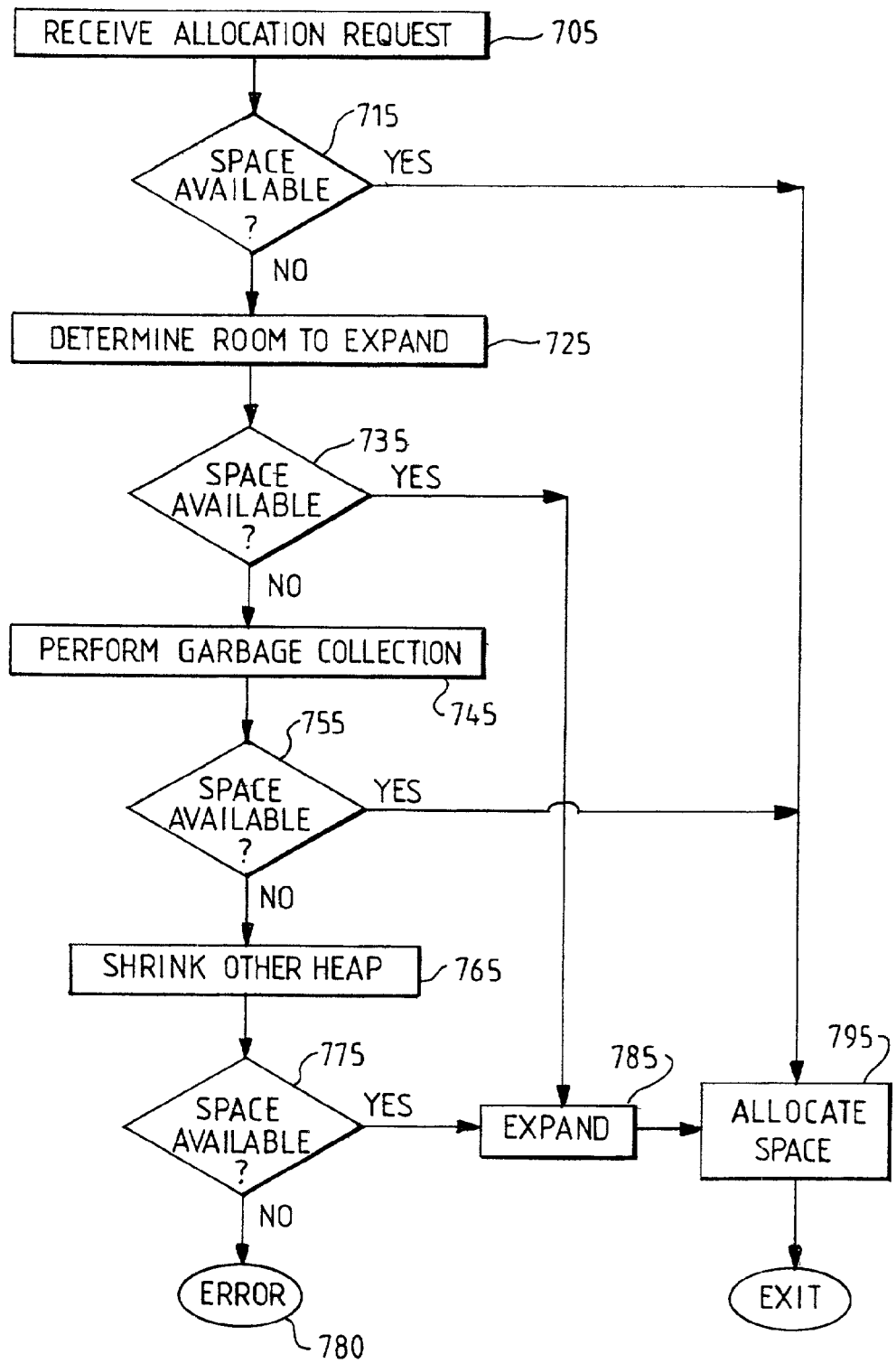
FIG. 7 is a flowchart illustrating heap expansion policy at a high level.

It will be appreciated that there are many possible variations on the processing shown in FIG. 7. For example FIG. 7 shows heap expansion (step 785) only when this will positively provide the required space (i.e. following a positive result from the tests of steps 735, 765, 775), but it will be appreciated that such heap expansion might be performed irrespective of whether or not this would create sufficient space for the allocation request for some or all of these tests. In fact, in the preferred embodiment, after garbage collection has been performed (step 745), the relevant heap will automatically try to expand to give 30% free space as previously described, even when the allocation request has already been satisfied (this is subject to certain limitations described in more detail below).

In addition, an attempt could be made to shrink the other heap (step 765) before performing garbage collection (step 745), or it may occur automatically as part of the garbage collection process. Thus in the preferred embodiment, the assigned boundary for the transient heap (line 522 in FIG. 5) is shrunk as much as possible each time the heap has been compacted, providing that this does not reduce the transient heap below its initial size. In contrast, although the middleware heap is also shrunk after compaction in the preferred embodiment, in general some leeway (such as 30% free space) is left between the heap boundary and the fill level. The middleware heap is also never reduced below its original size. This policy balances the fact that the transient heap is allowed to grow more easily than the middleware heap (as discussed below). More generally, such shrinkage after compaction returns storage to the unassigned pool, and so increases flexibility for managing storage requests from the two heaps. Note that because in the preferred embodiment shrinkage is performed (if possible) after compaction, which in turn will be performed if the garbage collection does not otherwise satisfy the allocation request, then to some extent steps 745 and 765 in FIG. 7 are effectively amalgamated together.

Although the processing shown in FIG. 7 applies at a high level, there are important differences in detail as regards the management of the transient and middleware heaps. The policies adopted reference a location 565 which represents the midpoint between the middleware heap boundary 512 and the transient heap boundary 522 (see FIG. 5), as determined at JVM start-up or JVM reset. Thus for the middleware heap, the procedure is expand the heap rather than garbage collect, using the expansion criteria described above, until the heap would expand past the midpoint location 565. If this situation does arise, then the system uses a smaller expansion increment, namely the minimum expansion value (i.e. 0.5 Mbyte in the preferred embodiment). Finally, if even this reduced expansion would still take the middleware heap past the midpoint, then a garbage collection is performed (i.e. step 745), rather than allowing the middleware heap to expand further. As previously indicated, a compaction will be performed here if necessary to satisfy the allocation request. After the garbage collection, the system will then try to expand the middleware heap using the standard policy based on 30% free space, or the minimum expansion value of 0.5 Mbyte if the 30% expansion would exceed the midpoint. In other words, the policy is to try to prevent the middleware heap from expanding past midpoint 565 (although this may happen eventually if the garbage collection does not reclaim sufficient space). The rationale behind this is to try to avoid taking up space from the transient heap, a particular concern being the possibility of a long-lived middleware object becoming pinned high up (in the sense of FIG. 5) in the heap storage 560, and therefore seriously limiting the amount of space available to the transient heap.

Considering now the transient heap, then once this reaches (or would reach) the midpoint 565, then again the expansion rate for this heap is reduced to half the minimum expansion value. However, unlike for the middleware heap, this expansion is allowed to continue on past the midpoint, until eventually all usable heap space is exhausted, when clearly a garbage collection will be needed. The motivation here is that it is expected that most new objects for the transaction will be created on the transient heap, so that this requires most room. Moreover, since the transient heap will be deleted anyway at the conclusion of the transaction, the concern about pinned objects is reduced (or the JVM will become dirty, as discussed in more detail below). A further consequence of this is that there is a general desire for performance reasons if possible to avoid a garbage collection during a transaction, but rather to postpone this if possible until the heap refresh (step 445, see FIG. 4) performed as part of the JVM reset.

With reference to step 765 in FIG. 7 (shrinking the other heap to reclaim space), this step is not performed for an allocation request to the transient heap (in other words, a No from step 755 would go straight to Error 780). However, it will be noted that if the allocation request is about to fail, the heap would already have been garbage collected and compacted, and the size of the heaps shrunk as per the policy discussed above, so that the amount of free space available to reclaim anyway is very limited. However, step 765 in FIG. 7 is performed for an allocation request to the middleware heap, in order to try to reclaim space from the transient heap. The effect of this, if successfuly, would generally be to reduce the transient heap below its original size.

As one minor subtlety on the above, in the preferred embodiment, the midpoint position is recalculated when the middleware heap is shrunk (but not when the transient heap size is altered, or when the middleware heap is enlarged), the new position being halfway between the current middleware heap boundary and the current transient heap boundary. This attempts to provide some tuning of the space allocation between the two heaps, although many other algorithms could be considered as the basis for the control procedure.

One complication that arises from effectively having multiple heaps of various sizes is that it becomes more complex to determine whether or not a given object reference is within a heap (as required, for example, for step 612 of FIG. 6A), and if so which one (in case, for example, they have different garbage collection policies). One possibility is to compare the reference with the information in the heap control block 530 (see FIG. 5). However, with multiple heaps, and also a system heap which is not necessarily contiguous, this becomes a time-consuming operation.

Figure 8:
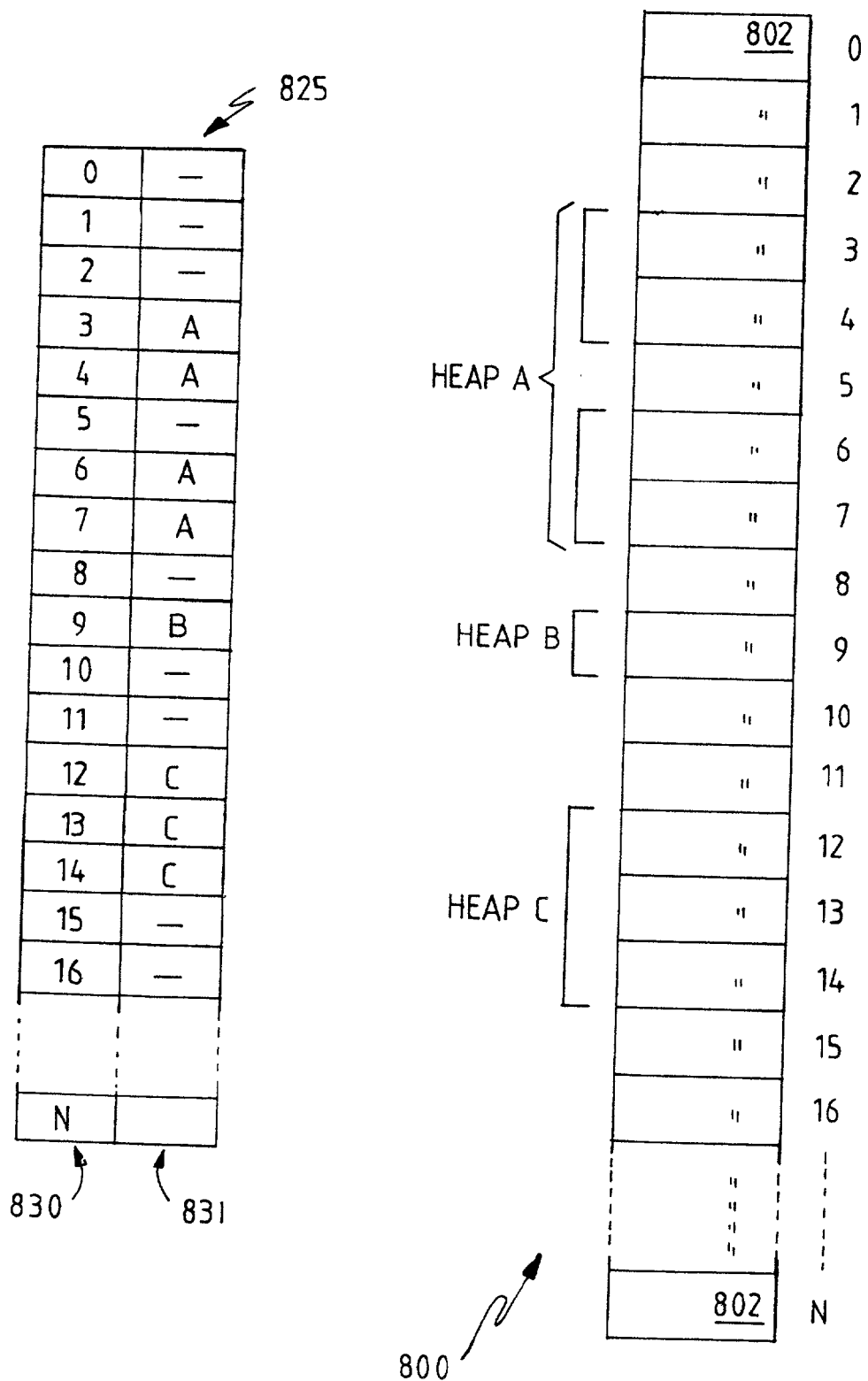
FIG. 8 is a diagram of a lookup table used to determine if a reference is in a heap.

In order to overcome this problem, the preferred embodiment adopts the approach illustrated schematically in FIG. 8. As shown, system address space or virtual memory 800 is split into chunks of a standard size, referred to herein as slices 802. As previously mentioned, in the preferred embodiment on a 32 bit system, these slices are each 64 KBytes in size. The slices can be numbered linearly as shown with increasing address space. The heaps can then be allocated out of these slices, in such a way that heap space is always allocated or deallocated in terms of an integral number of slices. FIG. 8 shows three different heaps (for simplicity termed A, B and C), whereby heap A is non-contiguous and comprises slices 3–4 and 6–7, heap B comprises slice 9, and heap C is contiguous and comprises slices 12–14 inclusive. Note that two or more of these heaps may possibly be being managed as single block of storage (i.e. in the same manner to the transient and middleware heaps of FIG. 5).

Also illustrated in FIG. 8 is lookup table 825, which has two columns, the first 830 representing slice number, and the second 831 representing heap number. Thus each row of the table can be used to determine, for the relevant slice, which heap it is in—a value of zero (indicated by a dash) is assumed to indicate that the slice is not currently in a heap. The system updates table 825 whenever slices are allocated to or deallocated from the heap.

Using table 825 it now becomes very quick to determine whether a given memory address is in a heap. Thus an initial determination is made of the relevant slice, by dividing the given memory location (minus the system base memory location if non-zero) by the slice size, and rounding down to the next integer (i.e. truncating) to obtain the slice number. This can then be used to directly access the corresponding heap identifier in column 831. In fact, it will be appreciated that column 830 of Table 825 does not need to be stored explicitly, since the memory location of each entry in column 831 is simply a linear function of slice number. More specifically, each entry in column 831 can typically be represented by 1 byte, and so the information for slice N can be found at the base location for table 825, plus N bytes. Overall therefore, this approach provides a rapid mapping from object location to heap identity (if any), irrespective of the number of heaps, or the complexity of their configuration.

Figure 9:
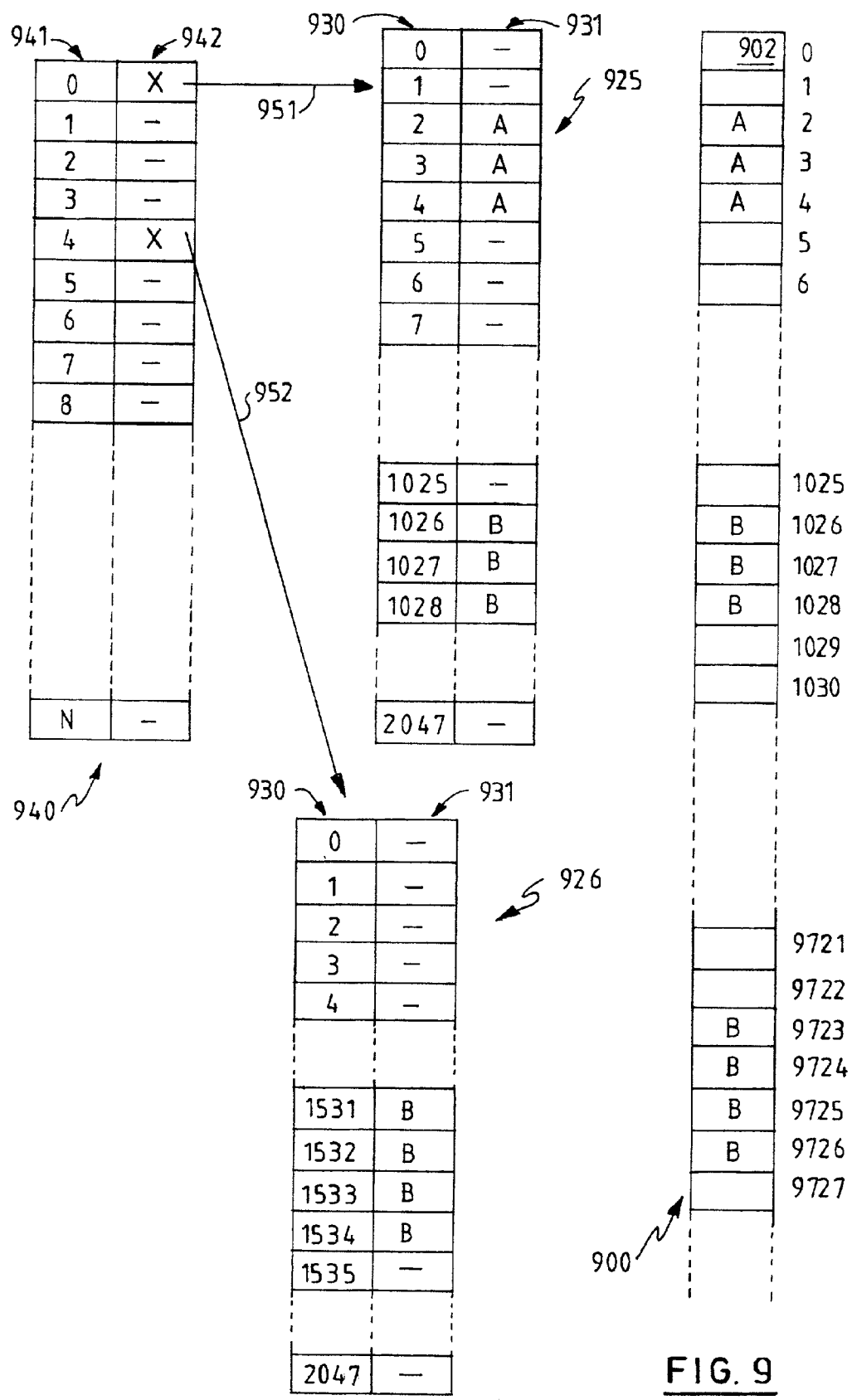
FIG. 9 is a diagram of a modified lookup structure for the same purpose as FIG. 8, but for use in a system with much larger memory.

One problem however with the technique illustrated in FIG. 8 is that on 64 bit machines, the virtual memory or address space is so great that table 825 would become prohibitively large. Thus in a preferred embodiment for such systems, a modified mapping is used, as shown in FIG. 9, which has an extra layer in the memory mapping arrangement. In the diagram, memory 900 represents the system address space or virtual memory, which as in FIG. 8 is divided into slices 902 (the difference from FIG. 8 being that on a 64 bit system, address space is much larger, so there are many more slices). FIG. 9 illustrates the location of two heaps, arbitrarily denoted A and B, with A comprising slices 2–4 inclusive, and B comprising slices 1026–1028 inclusive and also slices 9723–9726 inclusive.

Also shown in FIG. 9 are two lookup tables, 925, 926, each of which, for the sake of illustration, contains 2048 entries, and maps to a corresponding range of slices in address space 900. Thus lookup table 925 maps slices 0–2047, whilst lookup table 926 maps slices 8192–10239. These lookup tables are directly analogous to that of FIG. 8, in that they logically contain two columns, the first 930 identifying a slice number, and the second 931 the identity of any heap within that slice (or else zero). Tables 925 and 926 can be regarded as forming the lower level of the lookup hierarchy.

FIG. 9 also depicts a higher layer in the lookup hierarchy, namely table 940, which again logically contains two columns. The first column 941 logically represents the number of lookup table 925, 926 in the next lower layer of the lookup hierarchy, whilst the second column 942 contains a pointer to the relevant lookup table. Thus the first row of column 942 contains a pointer 951 to table 925, and the fifth row of column 942 contains a pointer 952 to table 926.

It will be noted that to conserve space, lookup tables in the lower level of the hierarchy only exist where at least some of the corresponding slices are assigned to a heap. Thus for the particular arrangement of FIG. 9, the lookup tables for slices 2048–4095, 4096–6143, and 6144–8191 have not been created, since none of these slices has been assigned to any heap. In other words, lookup tables 925, 926, etc for various slice ranges will be created and deleted according to whether any slices within that slice range are being utilised for the heap. If this is not the case, and the lookup table is deleted (or not created in the first place), the pointer in column 942 of top level lookup table 940 is set to zero.

The operation of the embodiment shown in FIG. 9 is analogous to that of FIG. 8, except that there is an extra level of indirection involved in the hierarchy. Thus to determine whether a particular reference or address is within a heap, the correct row is determined based on a knowledge of the size of a slice 902, and also the number of rows in each lower level lookup table 925, 926. It is expected that for most rows, the corresponding entry in column 942 will be null or zero, immediately indicating that that address is not in a heap slice. However, if the lookup selects a row which has a non-zero entry, this is then followed (using pointer 951, 952 or equivalent) to the corresponding lookup table. The desired entry is then found by locating the row using the reference under investigation (allowing for which particular lookup table is involved), and examining the entry for that row in column 931. This will indicate directly whether or not the slice containing the referenced location is in a heap, and if so, which one.

As an example of this, to investigate memory address 637405384 we first integer divide by 65536 (the size of a slice in the preferred embodiment), to give 9727 (truncated), implying we are in slice 9727. Next we perform an integer division of 9727 by 2048 (the number of entries in each lower level look-up table), to give 4 (truncated), implying we are in the 5th row of column 941. It will be appreciated that we could have got here directly by dividing 637405384 by 134217728 (which equals 2048×65536, or in other words, the total number of addresses per lower level lookup table). In any event, from the 5th row of table 940, it is determined that the corresponding entry in column 941 is non-zero, so that the specified address may possibly lie in a heap. Accordingly, pointer 952 is followed to table 926. Here we can determine that the row of interest is number 1535 (equal to 9727 modulo 2048), from which we can see that this particular slice is not, after all, part of heap. It follows of course that this is also true for any address within this slice.

Note that as for FIG. 8, the slice number columns 930 of lookup tables 925, 926 are not in practice needed, since the desired row in column 931 can be determined directly by using the slice number (modulo 2048) as an offset from the base address of the lookup table. Likewise, column 941 of table 940 is also redundant, since the relevant row can be determined directly from the address. In fact however, the vast majority of rows in table 940 (column 940) are likely to be zero, in which case storing the information in some other data structure such as a linked list would be much more efficient in terms of space (but may reduce lookup speed).

It will be appreciated that any suitable data structure can be used for storing the two levels of lookup information, shown as tables 940, and 925, 926 respectively. It will also be recognised that the sizes discussed with reference to FIGS. 8 and 9 (a slice size of 65536 bytes; 2048 slices per lower level lookup table) are exemplary only, and can be varied as circumstances dictate to optimize performance.

Figure 10A:
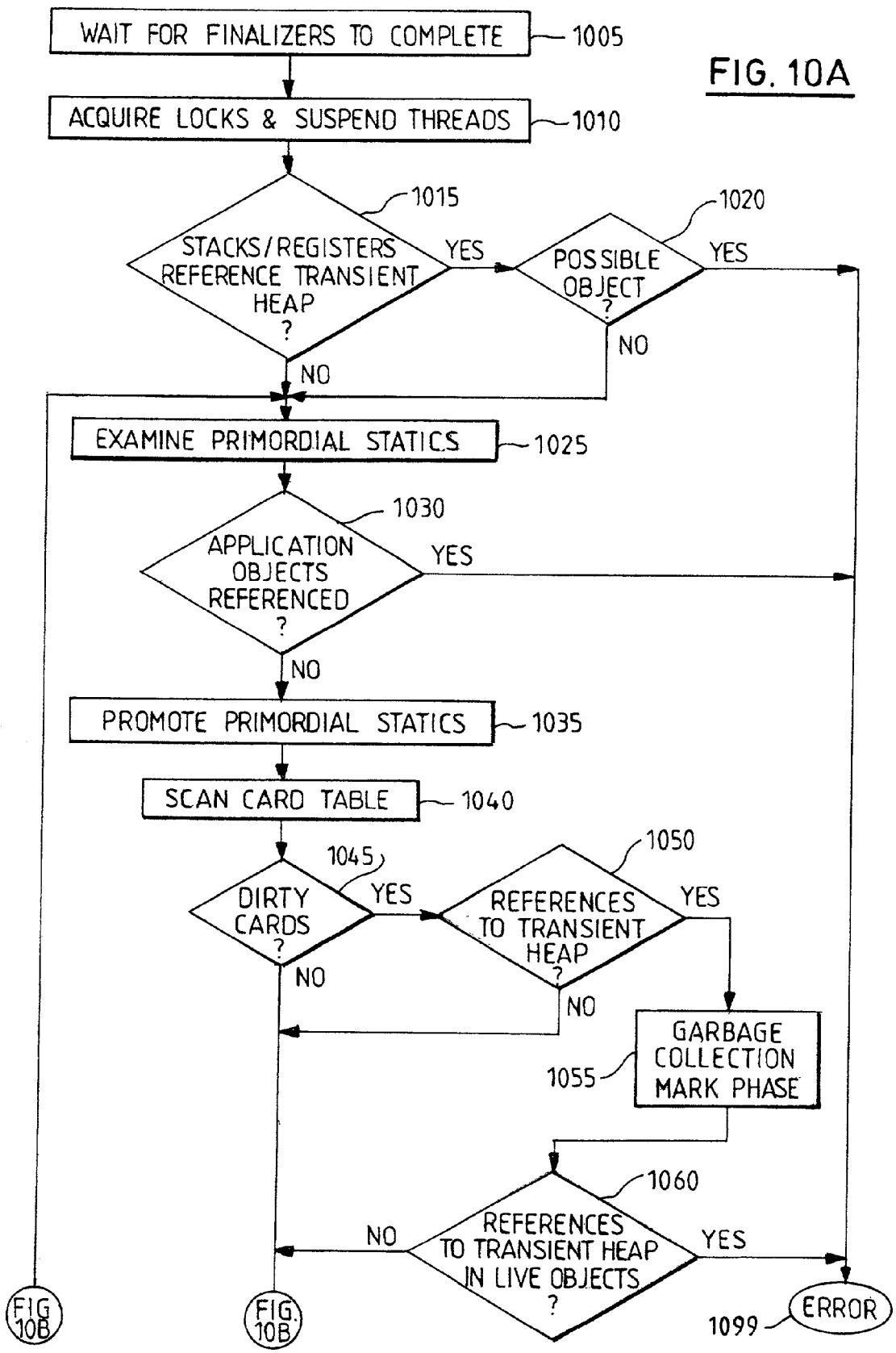
FIGS. 10A and 10B form a flowchart illustrating the operations taken to delete the transient heap during JVM reset.
Figure 10B:
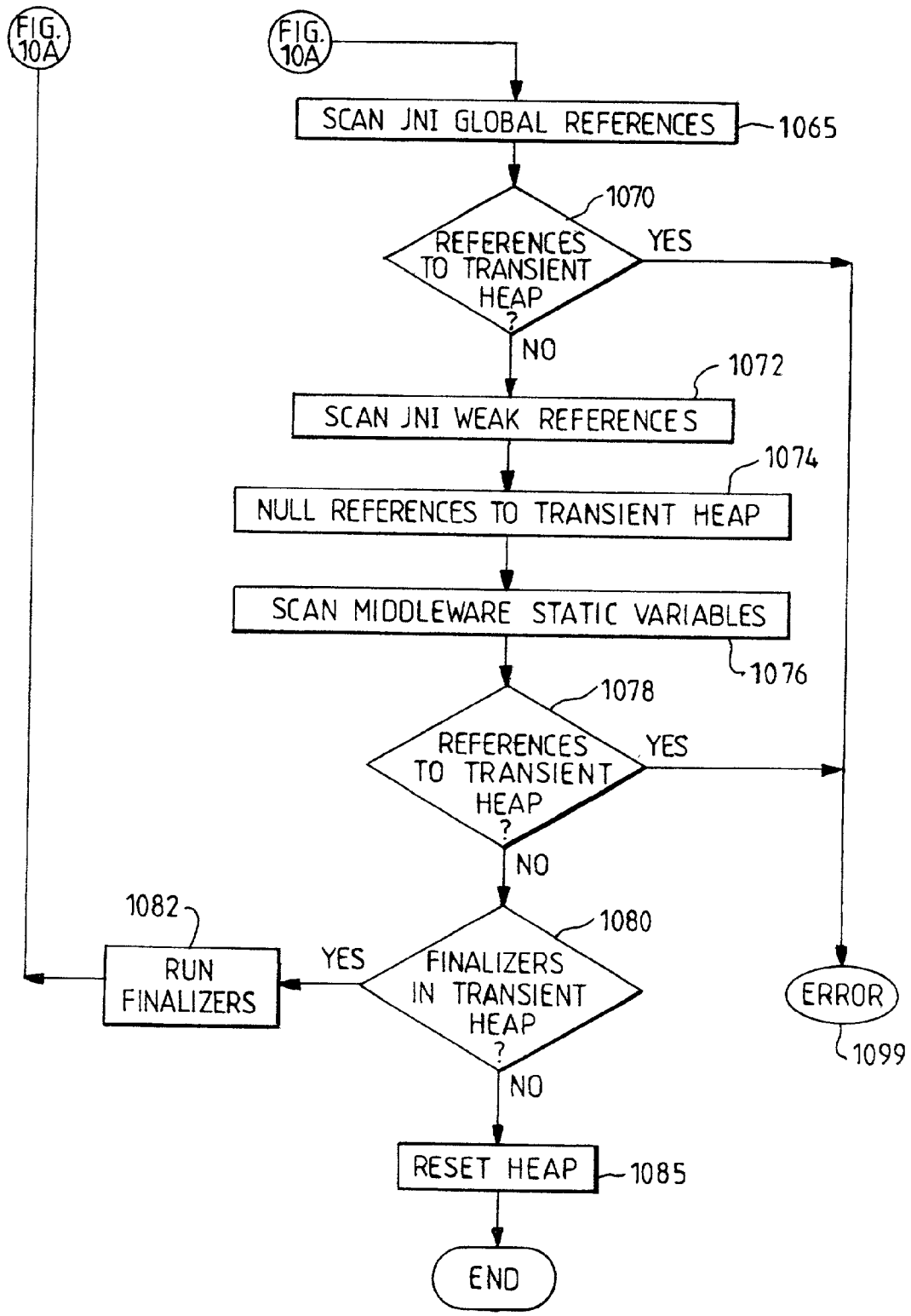

Returning now to FIG. 4, as previously described, at the end of a transaction the transient heap is deleted (equivalent to the refresh heap step 445, performed as part of the reset JVM). This activity is generally similar to garbage collection, although certain optimizations are possible, and certain additional constraints need to be considered. This process is shown in more detail in the flow chart of FIG. 10 (which is split for convenience into two components, 10A and 10B). The first step in FIG. 10A (1005) is to wait for all finalization activity to complete. Thus if there has been a GC during a transaction then there may be finalizers to be run and they must be run before the transient heap can be reset, as the finalizers could create (or require) other objects. This checking is performed by confirming that the reference handler and finalizer thread have emptied their respective queues, and that there are no other in-progress objects (i.e. the processing of all pending finalization objects has been completed). Next all the locks required for garbage collection are obtained, and all other threads are suspended (step 1010). The system is now in a position to commence deletion of the transient heap.

In order to accomplish this, the stacks and registers of all threads are scanned (as for a normal garbage collection), and if a reference is found to the transient heap (step 1015) then the JVM is potentially dirty and so cannot be reset. The reason for this as discussed in relation to standard garbage collection (FIG. 6) is that the references on the stacks and registers must be treated as live, even though it is not certain that they are in fact object references. To firm up on this the references are tested to see if it is possible to exclude them from being object references (step 1020), essentially by using the same three tests 612, 615 and 620 of FIG. 6. In other words, if the possible reference is not on the heap, or does not fall on an 8-byte boundary, or does not correspond to an allocated memory location, then it cannot in fact be a reference. Otherwise, the register or stack value may still be a reference, and so processing has to exit with an error that the JVM is dirty and cannot be reset (step 1099). Note that references from the stacks or registers to the middleware or system heap are of course acceptable, because objects on these heaps are not being deleted.

It will be appreciated that based on the above, a spurious data value in a stack or register will sometimes prevent JVM reset. However this happens relatively infrequently in practice, because all but the main application thread and certain system threads should have terminated at this point, so the stacks are relatively empty (nb the policy adopted in the preferred embodiment is that a JVM cannot be reset if more than a single transaction thread was used; multiple middleware threads are tolerated providing they have terminated by the completion of the middleware tidyups). Related to this, as previously mentioned finalizer objects on the transient heap are retained in that heap until a JVM reset. This means that references to such objects are not entered onto the stack for the finalizer thread, which would otherwise typically cause the reset to fail at steps 1015 and 1020 (this would be the case even where the finalize method for the object had been finished, since this would not necessarily lead to complete deletion of the corresponding stack entry; rather the finalizer thread may enter a function to wait for more work, resulting in uninitialized areas on the stack which may point to previously processed finalizer objects).

It is important to note that error 1099 indicating that the JVM is dirty does not imply that previous processing was incorrect, merely that the JVM cannot be reset (although of course this may in turn indicate some unexpected action by the application). In other words, a new JVM will need to be created for the next application. Because of this, if it is detected that the JVM is dirty, such as a negative outcome at step 1020, the method normally proceeds immediately to step 1099. This returns an error code to the reset JVM request from the middleware, with no attempt to continue to perform any further garbage collection. The reason for this is that the middleware may want to do a little more tidying up, but generally it is expected that it will terminate the current JVM fairly quickly. Hence there is unlikely to be a need for any further garbage collection, which rather would represent an unnecessary waste of time. A similar policy is adopted whenever the processing of FIG. 10A indicates that the JVM is dirty.

Assuming now a negative result from step 1015 or 1020, the JVM refresh continues with an examination of the primordial statics fields (step 1025) to see what objects they reference. Since these fields will be retained through the JVM reset, it is important that the objects that they reference, either directly or indirectly, are likewise retained. If however the referenced objects are application objects (tested at step 1030) then clearly these cannot be retained, because the application has essentially terminated, and the purpose of resetting the JVM is to allow a new application to commence. Therefore, if the primordial statics do reference an application object, then the JVM is marked as dirty, and the method proceeds to error 1099.

Assuming that the objects referenced by the primordial static fields are not application objects (typically they will be primordial object instances or arrays), then these are moved ("promoted") from the transient heap to the middleware heap (step 1035). The reason why such objects are placed on the transient heap initially is that at allocation time, it may not be known that the object to be allocated is a primordial static variable, or reachable from one.

(Note that this approach bears some similarities to generational garbage collection, in which new objects are initially allocated to a short-term heap, and then promoted to a longer-term heap if they survive beyond a certain time, but the criterion for promotion is different: essentially it is based on object type or usage, rather than age. Generational garbage collection is discussed further in the book by Jones and Lin referenced above).

One complication (not shown in FIG. 10) is that promoting an object from the transient heap to the middleware heap may lead to an allocation failure on the middleware heap if space is exhausted. In such an eventuality, a garbage collection is performed. If this still does not create enough space, then this will lead to error 1099.

After the primordial static objects have been promoted, the next step is to review the card table (536—see FIG. 5). The card table represents a set of bytes, one per fixed unit of heap (for example 512 bytes). Whenever an object reference is written to the heap, the card table is updated to indicate dirty (nb marking a card as dirty does not imply that the JVM itself is necessarily dirty). The card updated corresponds not to the portion of the heap which contains the updated object reference itself, but rather to the portion of heap which contains the top of the object that includes the the reference (for a small object these may of course be the same). Given that updating object references is a frequent operation, the card table must operate very quickly. This is the reason why each card is a byte despite containing only a single bit of information, because in practice this can be manipulated more quickly. Furthermore, no attempt at this write stage is made to investigate the nature of the reference update, for example whether the reference was set to a null value, or to an object in a particular heap.

Now during JVM reset the card table is scanned, or more particularly those cards which correspond to the region currently assigned to the middleware heap are scanned. Thus cards for the transient heap 520 and for the unassigned region 510 are not scanned, even if they have previously been part of the middleware heap. As part of this review, it is first determined whether any cards are set (i.e. marked as dirty) (step 1045). This indicates that a reference in the corresponding portion of the middleware heap has been updated since the last JVM reset, and so must be checked to confirm that it does not point to the transient heap. The first part of this check is to find all object references in objects which start in the heap portion corresponding to the marked card. Note that there may be more than one object to review here, or possibly none at all if the object previously located there has since been garbage collected and the space reused by a larger object whose beginning is situated outside that portion of the heap. For all objects associated with a marked card, all references contained in those objects (even if the references themselves are outside the portion of the heap corresponding to the card) are checked to see if they point to the transient heap (step 1050). If they do not, for example they contain only null pointers, and/or references to the middleware heap, then this is not a problem for JVM reset. On the other hand, it there are any such pointers to the transient heap from the middleware heap, this will be a problem on reset since those references will no longer be valid once the transient heap is cleared. The one exception to this is where the objects containing these problematic references are no longer live (i.e. could be garbage collected).

Therefore, on a positive outcome to step 1050, the system performs the mark phase of a garbage collection (step 1055), which is a relatively long operation. If the problematic references are in objects which are marked (i.e. live), as tested at step 1060, then they are indeed problematic, so the JVM must be regarded as dirty; hence the method proceeds to error 1099. On the other hand, if the problematic references are in objects which are not marked, then they can effectively be ignored, since these objects are no longer live.

Note that if the heaps have been compacted during a transaction, then this invalidates the card table. In such cases a full scan of the middleware heap is required to locate an object references to the transient heap, equivalent to the garbage collection mark phase of step 1055 if any such references are found.

Assuming that the test of step 1060 produces a negative output (i.e. no live middleware references to the transient heap), the method proceeds to scan JNI global references. These are references which are used by native code routines (i.e. running directly on OS 30 rather than on JVM 40, see FIG. 1) to refer to Java objects. Using the Java Native Interface (JNI) such references can be made global, that is available to all threads, in which case they will exist independently of the thread that created them. All such JNI global reference slots are scanned (step 1065) (see FIG. 10B) and if a reference to the transient heap is found (step 1070) the JVM is marked as dirty (i.e. error 1099), since these references will clearly fail once the transient heap is reset.

Providing this is not the case, the JNI weak references are scanned next (step 1072). These are references which the application specifies using JNI as expendable, in that they can be deleted if no longer used. According, any such weak JNI references to the transient heap that are found can be nulled (step 1074), thereby permitting the JVM reset to proceed.

Next, the static variables of all middleware classes are scanned (step 1076) to see if any directly reference the transient heap (step 1078). Note that these won't previously have been examined, since they are on the system heap rather than the middleware heap. If a direct reference to the transient heap is found, the JVM is dirty, corresponding to error 1099. (Note that unlike for the primordial statics (step 1025) there is no need to iteratively follow references from the middleware statics, since any indirect references will already have been picked up by preceding analysis). If no transient heap references are found, the processing continues to step 1080 in which objects on the transient heap are reviewed to see if any have finalizer methods., and any that are found are now run (step 1082). One important aspect of the preferred embodiment is that these finalizer methods are run on the main thread, rather than being passed to the system finalizer. An implication of this is that the finalizer methods will be run in the known and controllable context of the main thread. In addition, it is ensured that the finalizer methods complete before progressing to the next stage of the JVM reset. Unfortunately, finalizer methods can create fresh objects, which may newly reference the transient heap. Therefore, after the finalizer methods have completed, processing must return to step 1025 to repeat much of the checking, to ensure that the system is still in a position for JVM reset. In theory, if the finalizer methods have created new objects on the transient heap which themselves have finalizer methods, then this loop may have to be followed more than once.

Note that strictly speaking there is no formal requirement to run the finalizers at this stage, since this is the point at which the JVM would normally terminate at the conclusion of an application, rather than having a garbage collection performed. Nevertheless, the policy in the preferred embodiment is that object finalizers will be run before deletion at JVM reset, although other implementations may have different policies.

It is assumed that eventually all finalizers will be run, resulting in a negative outcome to the test of step 1080. In these circumstances, the method proceeds to step 1085, which represents reset of the JVM by deleting the transient heap. In practice, this involves several operations. Firstly, if the mark phase of the garbage collection was run (step 1055) then the sweep phase, which is relatively quick, is now run on the middleware heap. Next, various operations are performed to formally reset the transient heap, including: the removal of all transient heap monitors and the freeing of storage for transient heap class blocks (i.e. releasing the storage utilised by the class block, which is not on the heap). The transient heap pointers can now be reset so that the heap is effectively emptied, and restored to its initial size (by setting boundary 522 appropriately).

In the preferred embodiment it is declared that the transient heap will be set to the same initial size for each transaction. One potential problem with honouring this is that the middleware heap may have expanded during the previous application, and then retain this space through a reset of the JVM. Since there is no constraint on the transient heap shrinking below its initial size, to surrender space to the middleware heap if required, this can in turn make it impossible for the transient heap in the next incarnation of the JVM to be set to the same initial size as the current transient heap. If this problem arises, a specific attempt is made to shrink the middleware heap sufficiently to accommodate the correct initial size of the transient heap. However, if this attempt is unsuccessful, the JVM must be marked as dirty, and cannot be reset to its initial state.

Once the transient heap has been recreated (although it could be done before), a garbage collection is performed on the middleware heap if either of the following two cases is true: firstly, if the number of slices left in the unallocated portion of the heap, between the middleware heap and the transient heap, is less than two, or secondly if the amount of free space in the middleware heap plus half the unassigned portion 515 of the heap (see FIG. 5) is less than the amount of storage used by the previous transaction times three. Both of these can be regarded as a preemptive garbage collection, performing this operation now if the next transaction is otherwise likely to be constrained for space, in the hope that this will avoid a garbage collection during the transaction itself. Note that in the current implementation this preemptive garbage collection would be performed irrespective of whether a garbage collection mark phase was performed in step 1055. Finally, all the threads can be restarted and the garbage collection locks released, whereupon the reset is completed, and the JVM is available to support the next application.

The skilled person will be aware of many possible variations on the embodiment described above. The invention has been described primarily in relation to Java in a server environment, but it will be understood that it applies to any other language with similar properties (possibly C# from Microsoft Corporation), and is also potentially applicable to the client embodiment, such as when it is necessary to have a quick start-up of applications. In addition, many of the details of the systems and processes utilised are exemplary only, and can be varied according to particular circumstances Thus other modifications to the embodiments described herein will be apparent to the skilled person yet remain within the scope of the invention as set out in the attached claims.

What is claimed is:

1. A computer system comprising:
   an information storage subsystem comprising a contiguous linear portion which is logically divided into first and second heaps located at opposite ends of the storage subsystem, wherein any gap between the two heaps represents an unallocated region of storage, and wherein references are permitted from objects in the first heap to objects in the second heap and vice versa;
   a garbage collector for operating across both heaps to remove objects that are no longer live;
   a processor configured for expanding the first heap into the unallocated region according to a first expansion policy and for expanding the second heap into the unallocated region according to a second expansion policy; and
   a transaction processing environment, wherein the first heap is used for storing objects that are deleted at the end of the current transaction, and the second heap is used for storing objects that persist from one transaction to another; and
   wherein the first heap is reset to the same predetermined initial size at the start of each transaction, and the processor is structured to return an error condition when the second heap has expanded such that it is not possible to reset the first heap to its predetermined initial size.

2. The computer system of claim 1, wherein a midpoint is defined halfway between the first heap and second heap, when each heap has its initial size.

3. The computer system of claim 1, wherein the first expansion policy is always to expand into the unallocated region in order to satisfy a storage request.

4. A computer system comprising:
   an information storage subsystem comprising a contiguous linear portion which is logically divided into first and second heaps located at opposite ends of the storage portion subsystem, with any gap between the two heaps representing an unallocated region of storage, wherein references are permitted from objects on the first heap to objects on the second heap and vice versa;
   a garbage collector for operating across both heaps to remove objects that are no longer live;
   a processor configured for expanding the first heap into the unallocated region according to a first expansion policy and for expanding the second heap into the unallocated region according to a second expansion policy; and
   a transaction processing environment, wherein the first heap is used for storing objects that are deleted at the end of the current transaction, and the second heap is used for storing objects that persist from one transaction to another; and wherein the first heap is reset to the same predetermined initial size at the start of each transaction, and a midpoint is defined halfway between the first heap and the second heap, when each heap has its initial size; the first expansion policy is always to expand into the unallocated region in order to satisfy a storage request; and the rate of expansion of the first heap into the unallocated region is slower once the first heap has passed the midpoint.

5. A computer system comprising:
   an information storage subsystem comprising a contiguous linear portion which is logically divided into first and second heaps located at opposite ends of the storage portion subsystem, with any gap between the two heaps representing an unallocated region of storage, wherein references are permitted from objects on the first heap to objects on the second heap and vice versa;
   a garbage collector for operating across both heaps to remove objects that are no longer live;
   a processor configured for expanding the first heap into the unallocated region according to a first expansion policy and for expanding the second heap into the unallocated region according to a second expansion policy; and
   a transaction processing environment, wherein the first heap is used for storing objects that are deleted at the end of the current transaction, and the second heap is used for storing objects that persist from one transaction to another; and
   wherein the first heap is reset to the same predetermined initial size at the start of each transaction, the processor is structured to return an error condition if the second heap has expanded such that it is not possible to reset the first heap to its predetermined initial size, and the second expansion policy is to expand into the unallocated region in order to satisfy a storage request until the midpoint is reached, whereupon the system preferentially performs a garbage collection to satisfy the request.

6. A computer system comprising:
an information storage subsystem comprising a contiguous linear portion which is logically divided into first and second heaps located at opposite ends of the storage portion subsystem, with any gap between the two heaps representing an unallocated region of storage, wherein references are permitted from objects on the first heap to objects on the second heap and vice versa;
a garbage collector for operating across both heaps to remove objects that are no longer live;
a processor configured for expanding the first heap into the unallocated region according to a first expansion policy and for expanding the second heap into the unallocated region according to a second expansion policy; and
a transaction processing environment, wherein the first heap is used for storing objects that are deleted at the end of the current transaction, and the second heap is used for storing objects that persist from one transaction to another; and
wherein the first heap is reset to the same predetermined initial size at the start of each transaction, and
the processor is structured to return an error condition if the second heap has expanded such that it is not possible to reset the first heap to its predetermined initial size, wherein the second expansion policy further includes trying to shrink the first heap to allow room to expand the second heap in order to satisfy a storage request.

7. The computer system of claim 1, wherein the garbage collector performs a compact operation after a garbage collection of the first and second heaps, the compact operation being performed in response to a first set of criteria relevant to the first heap, and a second set of criteria relevant to the second heap.

8. The computer system of claim 1, where the second set of criteria are more sensitive to fragmentation than the first set of criteria.

9. The computer system of claim 1, further including means for shrinking the first and second heaps after compaction, and returning released storage to the unallocated region.

10. The computer system of claim 1, further comprising:
a bit array, having one bit for each possible object location in the portion of storage, the bit indicating whether or not there is an object currently stored at the corresponding object location.

11. A method of operating a computer system providing an object-based environment, the computer system including storage, a contiguous linear portion of which is logically divided into first and second heaps located at opposite ends of the storage portion, with any gap between the two heaps representing an unallocated region of storage, wherein references are permitted from objects on the first heap to objects on the second heap and vice versa, the method comprising steps of:
operating a garbage collector across both heaps to remove objects that are no longer live;
expanding the first heap into the unallocated region according to a first expansion policy;
expanding the second heap into the unallocated region according to a second expansion policy;

supporting a transaction processing environment wherein the first heap is used for storing objects that are deleted at the end of the current transaction, and the second heap is used for storing objects that persist from one transaction to another;
resetting the first heap to the same predetermined initial size at the start of each transaction; and
returning an error condition if the second heap has expanded such that it is not possible to reset the first heap to its predetermined initial size.

12. The method of claim 11, further comprising a step of defining a midpoint halfway between the first heap and second heap, when each heap has its initial size.

13. The method of claim 11, wherein the first expansion policy is always to expand into the unallocated region in order to satisfy a storage request.

14. The method of claim 13, in which the rate of expansion of the first heap into the unallocated region is slower once the first heap has passed the midpoint.

15. The method of claim 12, wherein the second expansion policy is to expand into the unallocated region in order to satisfy a storage request until the midpoint is reached, whereupon the system preferentially performs a garbage collection to satisfy the request.

16. The method of claim 15, wherein the second expansion policy further includes trying to shrink the first heap to allow room to expand the second heap in order to satisfy a storage request.

17. The method of claim 11, wherein the garbage collector performs a compact operation after a garbage collection of the first and second heaps, the compact operation being performed in response to a first set of criteria relevant to the first heap, and a second set of criteria relevant to the second heap.

18. The method of claim 17, where the second set of criteria are more sensitive to fragmentation than the first set of criteria.

19. The method of claim 17, further including steps of shrinking the first and second heaps after compaction, and returning released storage to the unallocated region.

20. The method of claim 11, further including a step of providing a bit array, having one bit for each possible object location in the portion of storage, the bit indicating whether or not there is an object currently stored at the corresponding object location.

21. A computer program product comprising program instructions recorded on a storage medium readable by a computer system, the computer system providing an object-based environment and including storage, a contiguous linear portion of which is logically divided into first and second heaps located at opposite ends of the storage portion, with any gap between the two heaps representing an unallocated region of storage, wherein references are permitted from objects in the first heap to objects in the second heap and vice versa, the program instructions causing the computer system to perform the steps of:
operating a garbage collector across both heaps to remove objects that are no longer live;
expanding the first heap into the unallocated region according to a first expansion policy;
for expanding the second heap into the unallocated region according to a second expansion policy;
wherein the computer system supports a transaction processing environment, and the first heap is used for storing objects that are deleted at the end of the current transaction, the second heap is used for storing objects that persist from one transaction to another, the first heap is reset to the same predetermined initial size at the start of each transaction, and the system returns an error condition if the second heap has expanded such that it is not possible to reset the first heap to its predetermined initial size.

22. The computer program product of claim 21, wherein a midpoint is defined halfway between the first heap and second heap, when the heaps each have their initial size.

23. The computer program product of claim 22, wherein the first expansion policy is always to expand into the unallocated region in order to satisfy a storage request.

24. The computer program product of claim 23, in which the rate of expansion of the first heap into the unallocated region is slower once the first heap has passed the midpoint.

25. The computer program product of claim 22, wherein the second expansion policy is to expand into the unallocated region in order to satisfy a storage request until the midpoint is reached, whereupon the system preferentially performs a garbage collection to satisfy the request.

26. The computer program product of claim 25, wherein the second expansion policy further includes trying to shrink the first heap to allow room to expand the second heap in order to satisfy a storage request.

27. The computer program product of claim 21, wherein the garbage collector performs a compact operation after a garbage collection of the first and second heaps, the compact operation being performed in response to a first set of criteria relevant to the first heap, and a second set of criteria relevant to the second heap.

28. The computer program product of claim 27, wherein the second set of criteria are more sensitive to fragmentation than the first set of criteria.

29. The computer program product of claim 27, wherein the program instructions further cause the computer system to perform steps of shrinking the first and second heaps after compaction, and returning released storage to the unallocated region.

30. The computer program product of claim 21, wherein the program instructions further cause the computer system to perform the step of providing a bit array, having one bit for each possible object location in the portion of storage, the bit indicating whether or not there is an object currently stored at the corresponding object location.

* * * * *